United States Patent
Lescoche et al.

(10) Patent No.: US 11,697,095 B2
(45) Date of Patent: Jul. 11, 2023

(54) TANGENTIAL FLOW SEPARATION ELEMENT INCORPORATING FLEXUOUS CHANNELS

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 838 days.

(21) Appl. No.: 16/467,621

(22) PCT Filed: Dec. 13, 2017

(86) PCT No.: PCT/FR2017/053537
§ 371 (c)(1),
(2) Date: Jun. 7, 2019

(87) PCT Pub. No.: WO2018/115639
PCT Pub. Date: Jun. 28, 2018

(65) Prior Publication Data
US 2019/0321890 A1    Oct. 24, 2019

(30) Foreign Application Priority Data

Dec. 21, 2016   (FR) ..................................... 16 63058

(51) Int. Cl.
*B01D 63/06*    (2006.01)
*B01D 65/08*    (2006.01)
(Continued)

(52) U.S. Cl.
CPC .......... *B01D 63/066* (2013.01); *B01D 65/08* (2013.01); *B22F 3/1146* (2013.01); *B22F 5/106* (2013.01);
(Continued)

(58) Field of Classification Search
CPC ........ B22F 10/20; B22F 3/1146; B22F 5/106; B22F 2005/004; B22F 10/10; B22F 10/70;
(Continued)

(56) References Cited

U.S. PATENT DOCUMENTS 3,648,754 A * 3/1972 Sephton ................. B01D 63/06
                                                              210/321.89
6,146,597 A * 11/2000 Nishida ................. B01D 45/12
                                                              55/459.3
(Continued)

FOREIGN PATENT DOCUMENTS

DE    195 42 531 A1    5/1997
FR    2 736 843 A1    1/1997
(Continued)

OTHER PUBLICATIONS

International Search Report, dated Mar. 5, 2018, corresponding to International Application No. PCT/FR2017/053537.
(Continued)

*Primary Examiner* — Pamela H Weiss
(74) *Attorney, Agent, or Firm* — Ladas & Parry LLP; Malcolm J. MacDonald, Esq.

(57) ABSTRACT

The invention provides a cross-flow separation element comprising a single-piece rigid porous support (2) having within its volume at least one channel (4₁) for passing a flow of the fluid medium for treatment, which channel presents a flexuous flow volume (V1) defined by sweeping a generator section along a curvilinear path around a reference axis, and
(Continued)

in that the reference axis does not intersect said generator section and is contained within the volume of the porous support.

22 Claims, 14 Drawing Sheets

(51) Int. Cl.
| | |
|---|---|
| *B22F 3/11* | (2006.01) |
| *B22F 5/10* | (2006.01) |
| *B22F 10/12* | (2021.01) |
| *B22F 10/14* | (2021.01) |
| *B22F 10/18* | (2021.01) |
| *B22F 10/28* | (2021.01) |
| *B33Y 10/00* | (2015.01) |
| *B33Y 80/00* | (2015.01) |
| *B22F 5/00* | (2006.01) |
| *C04B 111/00* | (2006.01) |
| *B22F 10/36* | (2021.01) |
| *B22F 10/366* | (2021.01) |
| *B22F 10/38* | (2021.01) |

(52) U.S. Cl.
CPC ............ *B22F 10/12* (2021.01); *B22F 10/14* (2021.01); *B22F 10/18* (2021.01); *B22F 10/28* (2021.01); *B01D 2321/2016* (2013.01); *B22F 10/36* (2021.01); *B22F 10/366* (2021.01); *B22F 10/38* (2021.01); *B22F 2005/004* (2013.01); *B33Y 10/00* (2014.12); *B33Y 80/00* (2014.12); *C04B 2111/00181* (2013.01); *C04B 2235/6026* (2013.01); *C04B 2235/665* (2013.01)

(58) Field of Classification Search
CPC .... B22F 3/11; B22F 5/10; B22F 10/00; B22F 10/12; B22F 10/14; B22F 10/18; B22F 10/28; B22F 10/36; B22F 10/366; B22F 10/38; B01D 63/066; B01D 65/08; B01D 2321/2016; B01D 46/24; B33Y 10/00; B33Y 80/00; C04B 2111/00181; C04B 2235/6026; C04B 2235/665; C04B 38/0003; C04B 35/00; C04B 38/06; Y02P 10/25

See application file for complete search history.

(56) References Cited

U.S. PATENT DOCUMENTS

| | | | |
|---|---|---|---|
| 6,217,764 B1 | 4/2001 | Bellhouse | |
| 10,293,307 B2 * | 5/2019 | Anquetil | B01D 63/066 |
| 10,369,745 B2 | 8/2019 | Lescoche et al. | |
| 10,478,781 B2 * | 11/2019 | Anquetil | B01D 69/02 |
| 2008/0203011 A1 | 8/2008 | Lescoche | |
| 2013/0199991 A1 | 8/2013 | Lescoche | |
| 2017/0182468 A1 * | 6/2017 | Rodrigues | B01D 69/046 |
| 2017/0232393 A1 | 8/2017 | Anquetil | |
| 2017/0239622 A1 | 8/2017 | Anquetil | |
| 2017/0246593 A1 * | 8/2017 | Anquetil | C04B 35/46 |
| 2018/0147534 A1 * | 5/2018 | Lescoche | B01D 63/06 |

FOREIGN PATENT DOCUMENTS

| | | | |
|---|---|---|---|
| FR | 3036628 A1 * | 12/2016 | ........... B01D 63/027 |
| GB | 2 223 690 A | 4/1990 | |
| WO | 03018719 A1 | 3/2003 | |
| WO | WO-2015177476 A1 * | 11/2015 | ............ B01D 29/25 |
| WO | WO-2016024057 A1 * | 2/2016 | ............ B01D 29/15 |

OTHER PUBLICATIONS

Ahmad, A. L. et al., "Reduction of membrane fouling using a helical baffle for cross flow microfiltration", School of Chemical Engineering, University Sains Malaysia, 2003.

Springer, Fanny et al., "Developing Lengths in Woven and Helical Tubes with Dean Vortices Flows", Engineering Applications of Computational Fluid Mechanics, vol. 3, No. 1, 2009, pp. 123-134.

Low, Ze-Xian et al., "Perspective on 3D printing of separation membranes and comparison to related unconventional fabrication techniques", Journal of Membrane Science, 2016, vol. 523, pp. 596-613.

Russian Search Report, dated Jan. 11, 2021, corresponding to Russian Application No. 2019122564/05.

Japanese Office Action, dated Oct. 5, 2021, corresponding to Japanese Application No. 2019-533557.

* cited by examiner

TANGENTIAL FLOW SEPARATION ELEMENT INCORPORATING FLEXUOUS CHANNELS

The present invention relates to the technical field of cross-flow separation elements for separating a fluid medium for treatment into a filtrate and a retentate, commonly referred to as filtration membranes.

More precisely, the invention relates to novel channel shapes for such separation elements enabling the flow of filtrate to be increased and/or serving to reduce the energy consumption of installations using such separation elements.

The invention also provides a method of fabricating such cross-flow separation elements by an additive technique.

Separation methods using membranes are used in numerous sectors, in particular in the environment for producing potable water and for treating industrial effluent, in the chemical, petrochemical, pharmaceutical, and agri-food industries, and in the biotechnology field.

A membrane constitutes a selective barrier that, under the action of a transfer force, allows certain components of the fluid medium for treatment to pass or to be stopped. Components pass or are stopped as the result of their size relative to the size of the pores in the membrane, which then behaves as a filter. Depending on the size of the pores, these techniques are referred to as microfiltration, ultrafiltration, or nanofiltration.

Membranes exist having structures and textures that are different. In general, membranes are built up on a porous support that provides the membrane with mechanical strength and, by defining the number and the morphology of channels, that determines the total filter surface area of the membrane. Specifically, a layer referred to as a "separator layer", a "filter layer", a "separation layer", an "active layer", or a "skin" on the inside walls of these channels performs separation. During separation, the transfer of the filtered fluid takes place through the separator layer, and then the fluid spreads through the porous texture of the support in order to go towards the outer peripheral surface of the porous support. This portion of the fluid for treatment that has passed through the separator layer and the porous support is referred to as "permeate" or "filtrate" and it is recovered in a collection chamber surrounding the membrane. The other portion is referred to as "retentate" and it is usually reinjected into the fluid for treatment upstream from the membrane by a circulation loop.

In conventional manner, when the support is made of ceramic material, the support is initially fabricated in the desired shape by extrusion, and is then sintered at a temperature and for a time that are sufficient to ensure the required solidity, while retaining in the resulting ceramic the desired open and interconnected porous texture. That method is restricted to obtaining one or more rectilinear channels within which the separator layer(s) is/are deposited and sintered. Supports are traditionally tubular in shape having one or more rectilinear channels arranged in parallel with the central axis of the support. In general, the inside surfaces of the channels are smooth and do not present any irregularities.

However, it has been observed that filtration membranes fabricated from supports having such shapes encounter problems of clogging or "fouling" and as a result present performance that is limited in terms of throughput. Specifically, small particles and macromolecules can become adsorbed on the surface of the separator layer or can be deposited thereon to form a gel or a deposit, and they can even penetrate into the pores and block some of them.

The principle of all membrane separation, and in particular of cross-flow separation, making use of filtration elements, lies in selective transfer of efficiency that depends on the selectivity of the membrane (the active layer) and on the permeability (flow) of the filtration element considered as a whole (support+active layer). Selectivity and permeability are not determined solely by the characteristics of the active layer and of its support since they can be reduced or limited by the appearance of clogging resulting from concentration polarization, from deposition, or from the pores being blocked.

The phenomenon of concentration polarization occurs during a filtering operation when the macromolecules present in the liquid for treatment become concentrated at the membrane/solution interface where they exert osmotic backpressure opposing the separation force or scattering back into the core of the liquid for treatment in application of Fick's law. The concentration polarization phenomenon results from retained compounds accumulating in the vicinity of the membrane because of the permeation of the solvent.

It is when the concentration of particles at the surface of the membrane increases so as to cause a condensed phase to appear in the form of a gel or of a cohesive deposit that hydraulic resistance appears in addition to the hydraulic resistance of the membrane.

Pores become blocked when particles of size smaller than or equal to the size of the pores intrude, thereby reducing the filtering surface area.

Clogging and its reversibility or non-reversibility are phenomena that are complex and that depend on the filtration element and in particular on the separator layers, on the liquid for treatment, and on operating parameters.

Clogging is a major brake to the economic attractiveness of filtering since, when dimensioning filter installations, it leads to increasing the installed surface areas in order to satisfy requirements in terms of volumes to be treated, and it also makes it necessary to implement specific technical means for countering clogging a posteriori, such as cleaning cycles making use of detergents or periodic back-washing.

In the prior art, proposals have already been made for numerous technical solutions that increase the flow of filtrate by seeking to reduce clogging phenomena by creating turbulent flow conditions inside the channel of a filtration element.

In a first type of solution, proposals have been made for the channels in the tubular filtration elements to receive helices or screws in order to create turbulence or vortices, as taught in patent U.S. Pat. No. 3,648,754 or in the publication "Reduction of membrane fouling using a helical baffle for cross-flow microfiltration", School of Chemical Engineering, University Sains Malaysia—2003, A. L. Ahmad, A. Mariadas, M. M. D. Zulkali. The helix inserted in the channel is a separate fitting that needs to be held in place (usually at the inlet of the channel). Inserting such a helix into each channel and fastening it to the inlet of each channel turns out to be difficult to achieve. Furthermore, the diameter of the helix is less than the diameter of the channel proper in order to enable it to be inserted, and should that be necessary also to be extracted. As a result clearance remains, allowing the helix to "float" and vibrate freely in the channel, and leading to rubbing against the active layer which it damages irreversibly. In addition, the existence of clearance leads to lateral leakage that short-circuits the helical flow of the fluid, thereby reducing the effectiveness of the helix.

Another type of solution lies in making indentations or projections in or on the inside walls of the channels so that disturbances are created for the fluid medium in the proximity of the filter surface, thereby limiting the accumulation of matter and clogging. Patent EP 0 813 445 proposes causing each channel to include a one-, two-, or three-start helical groove in its wall, the groove having a cross-section of about 25% of the total section of the channel. Application FR 2 736 843 teaches making porous tubes having a single channel with walls having indentations, while the peripheral wall of the support is smooth. For that purpose, the porous tube is shaped by means of an extrusion die that includes a cylindrical pin arranged on its axis, the outlet pin or matrix of the die being mounted to rotate and being of section that is not circular.

Making grooves or indentations in the inside surfaces of channels does not cause all of the fluid medium to follow a helical path, thereby limiting the advantage of such solutions. Furthermore, the technique for fabricating such separation elements is limited to certain types of indentation, mainly indentations that are continuous from one end of the separation element to the other and that cannot give rise to any variation in the through section of the channel. Furthermore, it cannot be transposed to fabricating separation elements having a plurality of internal channels. However, multichannel separation elements are increasingly demanded since they serve to increase the filter surface area and thus improve performance.

For the same purpose, patent application FR 3 024 665 proposes a cross-flow separation element for separating a fluid medium for treatment into a filtrate and a retentate. That element comprises a single-piece rigid porous support with at least one channel for passing a flow of the fluid medium for treatment between an inlet and an outlet. The porous support has an outside surface for recovering the filtrate that has passed through the support.

That document proposes making obstacles to the flow of the fluid for filtering on the inside walls of the channels, the obstacles presenting continuity of material and porous texture with the support. According to patent application FR 3 024 664, at least one channel presents an obstacle that is in particular in the form of a helix arranged on the inside wall of the support. Such obstacles impede or disturb the flow of the fluid, which has to go round them, thereby creating turbulence that is helpful in reducing clogging, but nevertheless with the major drawback of simultaneously creating, immediately downstream from each obstacle, an inoperative zone where the speed of the fluid is almost zero.

Another type of solution concerns creating a Dean vortex in order to reduce clogging and increase the flow of permeate in organic ultrafiltration membranes. Thus, the publication "Developing lengths in woven and helical tubes with Dean vortices flows", Engineering Applications of Computational Fluid Mechanics, Vol. 3, No. 1, pp. 123-134 (2009), F. Springer, E. Carretier, D. Veyret, P. Moulin gives a theoretical treatment with digital simulation of the appearance of Dean vortices and the speed increases they induce locally in organic hollow fibers of circular section that are helically curved, while nevertheless presenting the major drawbacks of the diameter of said circular section being limited to a maximum of 2 millimeters (mm). In addition, the techniques for curving the organic fiber as described in that publication give rise to dependency between the pitch and the diameter of the turns.

In this context, the present invention proposes providing novel rigid filtration elements that present a single-channel or multichannel structure with a shape adapted to increasing the flow of filtrate and to reducing the consumption of energy in installations that make use of such separation elements.

In order to achieve this object, the invention provides a cross-flow separation element for separating a fluid medium for treatment into a filtrate and a retentate, said separation element comprising a single-piece rigid porous support having arranged inside its volume at least one channel for passing a flow of the fluid medium for treatment between an inlet for the fluid medium for treatment and an outlet for the retentate, the single-piece rigid porous support having an outside surface for recovering the filtrate that has passed through said support. According to the invention, at least one channel presents, between the inlet and the outlet, a flexuous flow volume defined by sweeping a generator plane section along a curvilinear path around a reference axis, and the reference axis does not intersect said generator section and is contained within the volume of the porous support.

The separation element also includes in combination one and/or more of the following additional characteristics:
  the flexuous flow volume of at least one channel is defined over a fraction only of its length between the inlet and the outlet or over its entire length from its inlet to its outlet;
  the single-piece rigid porous support has a plurality of flow channels for the fluid medium arranged inside said support;
  at least one channel presents a generator section of area that is constant or variable;
  at least one channel presents a generator section of shape that is constant or variable;
  the generator section of at least one channel is spaced apart from the reference axis by a distance that is constant;
  the generator section of at least one channel is spaced apart from the reference axis by at distance that is variable;
  the reference axis is tangential to the generator section of at least one channel;
  a series of a plurality of channels presenting generator sections that are spaced apart from the reference axis by a distance R adapted to ensure they are separated from one another by separating partitions;
  the generator section of at least one channel follows a path that results from a movement in translation of constant or variable direction combined over at least a fraction taken between the inlet and the outlet with a movement in rotation about the reference axis at a pitch that is constant or variable and in a left-handed or right-handed direction;
  the path presents a pitch p lying in the range 0.1 mm to 250 mm, and the distance between the curvilinear path and the reference axis lies in the range 0.1 mm to 100 mm;
  the generator section of at least one channel taken over at least a fraction between the inlet and the outlet follows a path that is helical;
  the generator section of at least one channel, taken over a limited fraction from the inlet to the outlet follows a path that results from movement in translation parallel to the reference axis;
  at least one channel presents a generator section extending perpendicularly to the reference axis or parallel thereto;
  the porous support is made of a material selected from organic materials such as polyamide, polyetherketoneketone, polystyrene, alumide, polyphenylsulfone, fluorinated thermoplastic elastomers, polypropylene, polyethylene, epoxy, acrylate, acrylonitrile butadiene styrene, polymethyl methacrylate, polycarbonate, nylon, polyetherimide, acrylonitrile styrene acrylate, polylactic acid, polyvinyl chloride, and mixtures thereof, selected from the following inorganic materials such as aluminum oxide, titanium oxide, zirconium oxide, aluminum titanate, aluminum nitride, titanium nitride, boron nitride, silicon nitride, sialon, graphite carbon, silicon carbide, tungsten carbide, and mixtures thereof, selected from the following metallic materials such as aluminum, alloys of aluminum, alloys of cobalt and chromium, alloys of nickel, alloys of nickel and chromium, steels and stainless steels, titanium, alloys of titanium, alloys of copper and tin, alloys of copper, tin, and aluminum, alloys of copper and zinc, and mixtures thereof;

a porous support and at least one separator layer continuously deposited on the inside wall of each channel, each separator layer being made of a ceramic selected from oxides, nitrides, carbides, and other ceramic materials and mixtures thereof, and in particular titanium oxide, alumina, zirconia, or a mixture thereof, titanium nitride, aluminum nitride, boron nitride, silicon carbide, optionally mixed with another ceramic material;

the channels present hydraulic diameters lying in the range 0.5 mm to 20 mm;

each channel presents a hydraulic diameter that is constant or variable;

the support presents a mean pore diameter lying in the range 4 micrometers (µm) to 100 µm; and the mean pore diameter corresponds to the d50 values of the volume distribution at which 50% of the total volume of the pores correspond to the volume of pores of diameter less than the d50 value, the volume distribution being obtained by mercury penetration, e.g. using the technique described in ISO standard 15901-1: 2005.

The invention also provides a novel method of fabricating a cross-flow separation element wherein the support is made by forming superposed individual plies that are successively bonded to one another so as to grow progressively the three-dimensional shape of the support within which there is arranged at least one flexuous channel in accordance with the invention.

Furthermore, the method of the invention consists in making the support by the additive technique in which, by using computer assisted design software, the shape of the support is subdivided into slices, these slices being made one by one in the form of individual plies that are superposed and bonded together in succession by repeating the following two steps: depositing a bed of powder material for forming the support, the bed being continuous, uniform, and of constant thickness, and, at the level of said ply, covering an area that is greater than the section of said porous body to be formed; and consolidating a portion of the deposited material in localized manner in accordance with a pattern determined for each ply so as to create the individual ply; these two steps being repeated in such a manner as to ensure, at each repetition, that the individual ply formed in this way is simultaneously bonded with the previously formed ply so as to cause the shape of the support to grow progressively.

Various other characteristics appear from the following description given with reference to the accompanying drawings, which show embodiments of the invention as non-limiting examples.

Figure 1A:
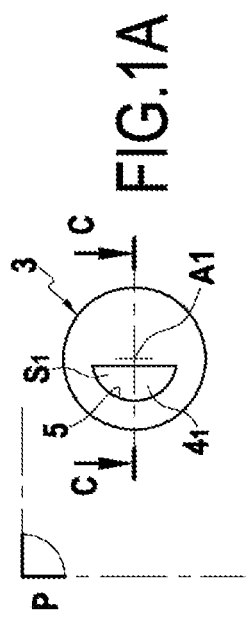
FIG. 1A is an end view showing a first embodiment of a separation element in accordance with the invention.
Figure 1B:
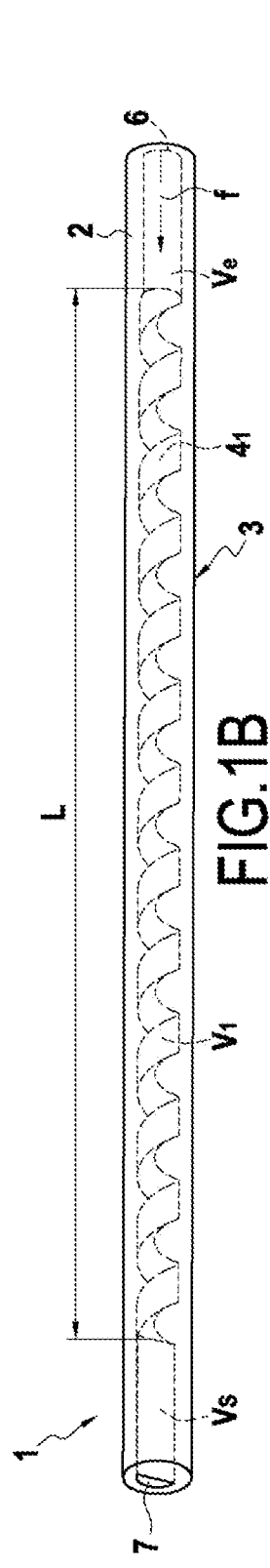
FIG. 1B is a perspective view of the separation element shown in FIG. 1A.
Figure 1C:
FIG. 1C is a longitudinal section of the separation element on lines C-C of FIG. 1A.
Figure 1D:
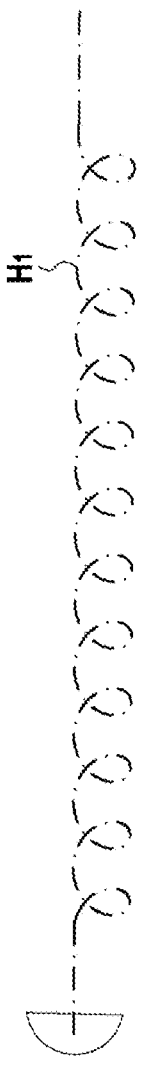
FIG. 1D is a perspective view showing the path used for constructing a flexuous channel arranged in the separation element shown in FIG. 1B.

As a preliminary point, some definitions of the terms used in the context of the invention are given below.

The term "mean grain size" is used to mean the d50 value of a volume distribution for which 50% of the total volume of the grains corresponds to the volume of grains having a diameter less than the d50 value. The volume distribution is the curve (an analytic function) representing the frequencies of grain volumes as a function of their diameter. The d50 value corresponds to the median that separates into two equal portions the area situated under the frequency curve obtained by laser diffraction granulometry, which is the reference technique used in the context of the invention for measuring mean grain diameter. For the technique of measuring d50, reference can be made in particular to the following:

ISO standard 13320:2009, for the technique of measurement by laser granulometry;
ISO standard 14488:2007, for techniques of sampling the powder under analysis; and
ISO standard 14887:2000, for reproducibly dispersing the powder sample in the liquid prior to performing measurement by laser granulometry.

The term "mean pore diameter" is used to mean the d50 value of a volume distribution for which 50% of the total volume of the pores corresponds to the volume of the pores having a diameter less than the d50 value. The volume distribution is the curve (an analytic function) representing the frequency of pore volumes as a function of their diameter. The d50 value corresponds to the median that separates into two equal portions the area situated under the frequency curve obtained by mercury penetration for mean diameters of the order of a few nanometers (nm), or for pore diameters that are smaller, by adsorption of gas, and in particular of $N_2$, these two techniques being used as references in the context of the invention for measuring mean pore diameter.

In particular, it is possible to use the techniques described in the following:

ISO standard 15901-1:2005, for the technique of measurement by mercury penetration; and
ISO standards 15901-2:2006 and 15901-3:2007, concerning the technique of measurement by gas adsorption.

The invention proposes cross-flow separation elements for separating a fluid medium for treatment into a filtrate and a retentate, comprising a porous single-piece support provided with one or more channels of shape that is selected to provide flow along a path that is flexuous, sinuous, and advantageously helical for the major fraction or for all of the fluid to be filtered, any remaining fluid possibly flowing in one or more channels that are not flexuous.

One or more flow channels for the fluid to be filtered are arranged in the porous support. Each of these flow channels has an inlet and an outlet. In general, the inlets of the flow channels are positioned at one of the ends of the support, this end acting as an inlet zone for the fluid medium for treatment, and the outlets are positioned at the other end of the support, acting as the outlet zone for the retentate.

In such separation elements, the body constituting the support presents a texture that is porous. The porous texture is characterized by a mean pore diameter as deduced from their distribution measured by mercury penetration porosimetry. Typically, the porous support presents a mean pore diameter lying in the range 4 μm to 100 μm.

The porous texture of the support is open and forms an interconnected array of pores, thereby enabling the fluid filtered by the filtration separator layer to pass through the porous support and be recovered at the periphery. It is the practice to measure the permeability of the support to water in order to specify the hydraulic resistance of the support. Specifically, in a porous medium, the steady flow of an incompressible viscous fluid is governed by Darcy's law. The speed of the fluid in the pores (the permeate) is proportional to the pressure gradient and inversely proportional to the dynamic viscosity of the fluid, which are related by a characteristic parameter referred to as "permeability" that can be measured by way of example in application of French standard NF X 45-101 of December 1996.

The permeate is thus recovered from the peripheral surface of the porous support. The walls of the channels are continuously covered by at least one filtration separator layer that serves to filter the fluid medium for treatment. By definition, the filtration separator layers must have a mean pore diameter that is less than that of the support. The separator layers define the surface of the cross-flow separation element that is to be in contact with the fluid for treatment and along which the fluid for treatment flows.

The thicknesses of the filtration separator layers typically lie in the range 1 μm to 100 μm. Naturally, in order to perform its separation function, and in order to act as an active layer, each separator layer presents a mean pore diameter that is less than the mean pore diameter of the support. Usually, the mean pore diameter of the filtration separator layers is less that the mean pore diameter of the support by a factor of at least 3, and preferably by a factor of at least 5.

The concepts of a microfiltration, ultrafiltration, and nanofiltration separator layer are well known to the person skilled in the art. It is generally accepted that:

microfiltration separator layers present a mean pore diameter lying in the range 0.1 μm to 10 μm;
ultrafiltration separator layers present a mean pore diameter lying in the range 10 nm to 0.1 μm; and
nanofiltration separator layers present a mean pore diameter lying in the range 0.5 nm to 10 nm.

It is possible that this micro- or ultrafiltration layer, referred to as the "active" layer, is deposited directly on the porous support, or else on an intermediate layer having a smaller mean pore diameter, which is itself deposited directly on the porous support.

By way of example, the separator layer may be constituted by a ceramic selected from among oxide, nitrides, carbides, or other ceramic materials and mixtures thereof, and in particular titanium oxides, alumina, zirconia, or a mixture thereof, titanium nitride, aluminum nitride, boron nitride, silicon carbide, possibly mixed with another ceramic material.

By way of example, the separator layer may also be constituted by one or more polymers such as polyacrylonitrile (PAN), polystyrene (PS), polystyrene sulfonate (PSS), polyether sulfone (PES), polyvinylidene fluoride (PVDF), cellulose acetate, or other polymers.

FIGS. 1A to 1D show a first embodiment of a cross-flow separation element 1 in accordance with the invention comprising a porous support 2 made to be elongate in shape so that the porous support can be said to be "rectilinear". The porous support 2 shown in FIGS. 1A to 1D possesses a right cross-section that is circular and thus presents an outside surface 3 that is cylindrical, however this right cross-section could be arbitrary or polygonal. In a preferred embodiment characteristic of the invention, the outside or peripheral surface 3 of the support presents a profile that is constant. In other words, the outside surface 3 does not present any surface irregularity other than that due to surface roughness inherent to the material and to the shaping method used. Thus, the outside surface 3 does not possess any deformations or indentations.

The porous support 2 includes at least one flow channel, and in general manner a plurality of flow channels $4i$ for passing the fluid medium, each arranged inside the porous support 2. (The index $i$ is used in general manner to designate some characteristic of the support and it may take values 1, 2, 3, . . . as a function of the number of characteristics that are described in the embodiments.)

Figure 13A:
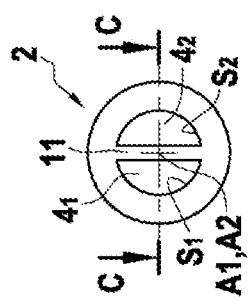
FIG. 13A is an end view of a support provided with a pair of channels in accordance with the invention.
Figure 13B:
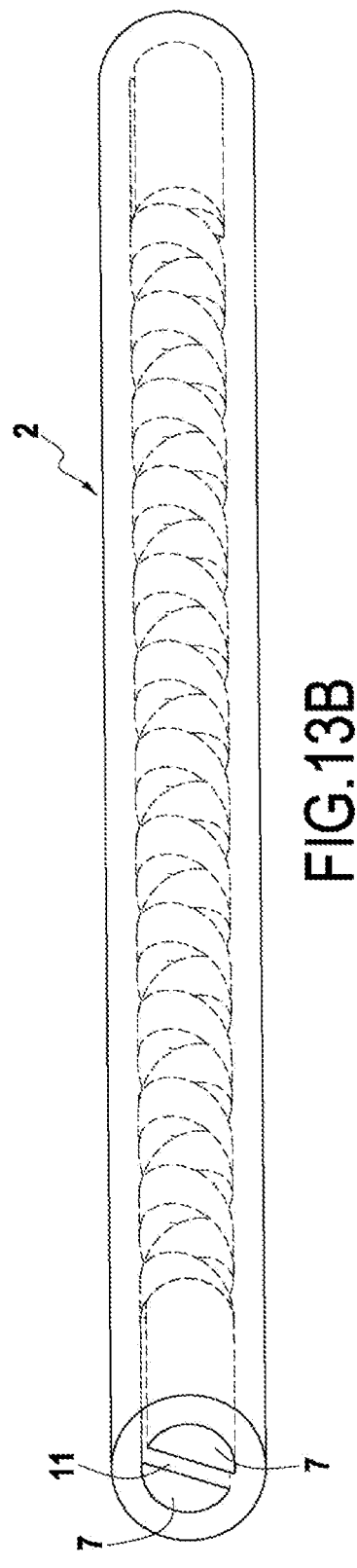
FIG. 13B is a perspective view showing the support having a pair of channels in accordance with the invention and as shown in FIG. 13A.
Figure 13C:
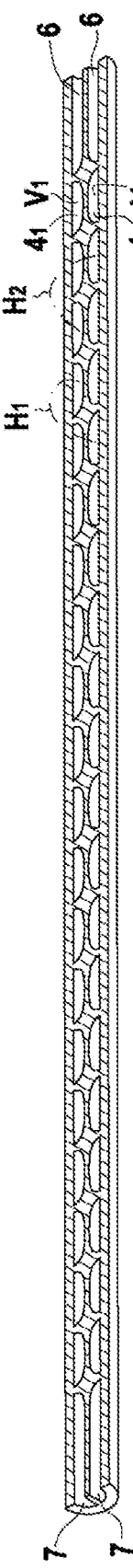
FIG. 13C is a longitudinal section view of the support on lines C-C of FIG. 13A.
Figure 13D:
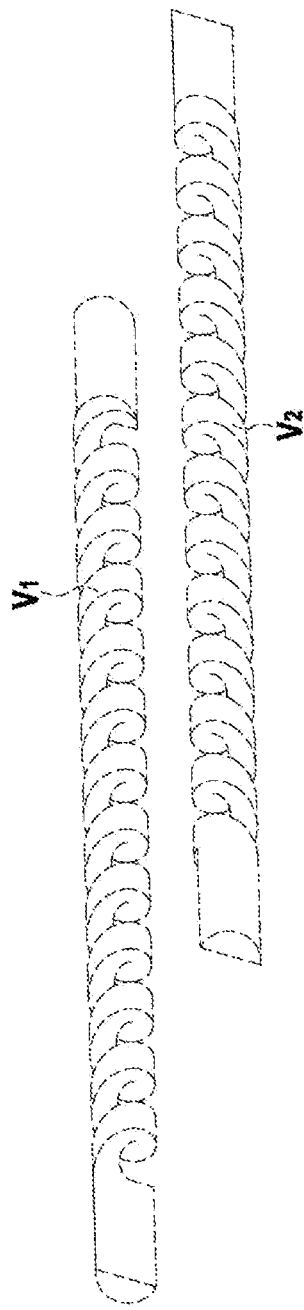
FIG. 13D is a perspective view showing separately the flexuous flow volumes V1 and V2 in accordance with the invention for each of the two channels shown in FIGS. 13A to 13C.
Figure 13E:
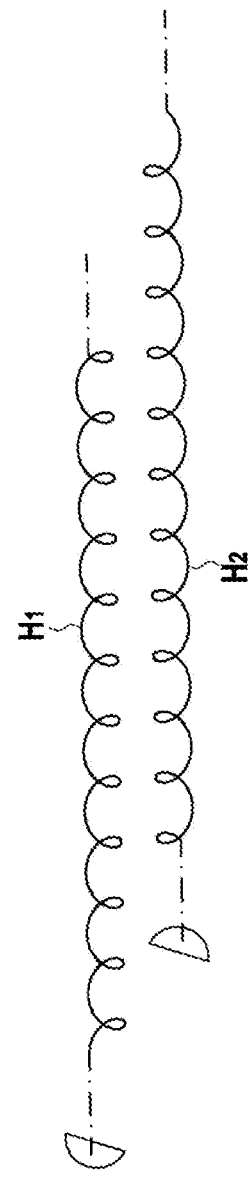
FIG. 13E is a perspective view showing, separately, the paths H1 and H2 of the flexuous flow volumes V1 and V2 in accordance with the invention for each of the two channels shown in FIGS. 13A to 13D.

In a first embodiment shown in FIGS. 1A to 1D, the porous support 2 has a single channel $4_1$, and in a second embodiment shown in FIG. 13A, it has two channels $4_1$ and $4_2$. In a third embodiment shown in FIG. 14A, the porous support 2 has fourteen channels, while in a fourth embodiment shown in FIG. 15A, the porous support 2 has twenty-three channels arranged in three categories of channels $4_1$, $4_2$, and $4_3$.

Each channel $4i$ corresponds to a zone of the porous support 2 that does not comprise porous material and that is defined inside the porous support by a wall 5 presenting a surface that is covered by at least one separator layer for coming into contact with the fluid medium for treatment that is flowing inside the channels. A portion of the fluid medium passes through the separator layer deposited on the wall 5 of the porous support 2, so that this quantity of the treated fluid, referred to as "permeate", flows through the outside surface 3 of the porous support. The fluid medium for treatment flows in the channel between an inlet 6 and an outlet 7 in a flow direction represented by arrow f. The inlet 6 is situated at one end of the porous support and the outlet 7 at the other end of the porous support.

In accordance with the invention, the porous support 2 includes at least one channel $4i$ of shape that is adapted to increase the throughput of filtrate. This shape is defined by the fact that each of the channels $4i$ presents at least one flexuous flow volume Vi between the inlet 6 and the outlet 7, which volume is defined by sweeping a generator section Si along a curvilinear path Hi around a reference axis Ai, the generator section Si being situated in a plane P referred to as a "reference" plane. Furthermore, the reference axis Ai does not intersect said generator section Si and is contained within the volume of the porous support 2.

It should be understood that a channel $4i$ in accordance with the invention has at least one flexuous flow volume Vi as specified above. Naturally, this flexuous flow volume Vi corresponds to a zone of the porous support 2 that does not include any porous material, and it is defined by the walls of the channel. It should be observed that the porous support 2 presents varying thickness in the plane P between its outside surface 3 and the wall 5 of the channel taken.

This flexuous flow volume Vi in accordance with the invention is defined between the inlet 6 and the outlet 7. This flexuous flow volume Vi may be present over only a fraction of the length of the channel taken between the inlet 6 and the outlet 7, or else over the entire length of the channel taken between its inlet and its outlet. Naturally, the porous support 2 may include at least one flow channel for the fluid medium for treatment that does not include a flexuous flow volume Vi in accordance with the invention.

Figure 2A:
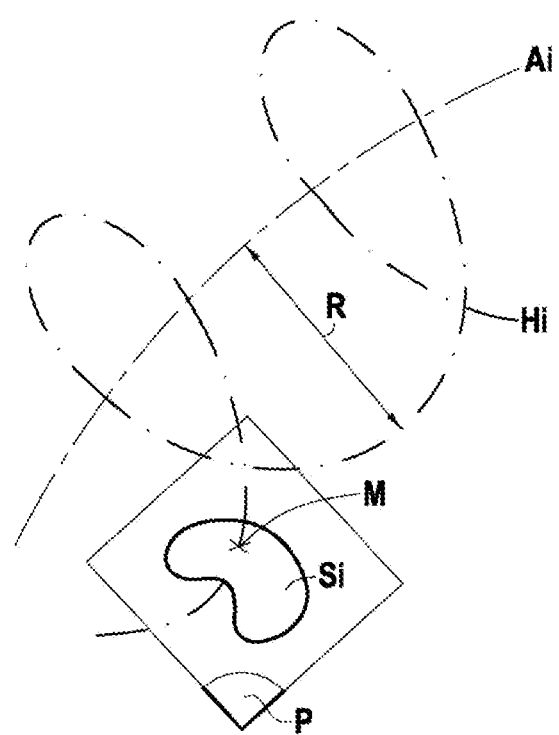
FIG. 2A shows how a flexuous flow volume is constructed for a channel of a separation element in accordance with the invention.

The general principle for constructing a flexuous channel presenting a flow volume Vi in accordance with the invention is particularly well illustrated in FIG. 2A. The general principle for constructing a flexuous channel consists in causing a plane generator section Si to follow a curvilinear path Hi constructed between the two ends of the flow volume Vi by the movement of a point M belonging to the plane generator section and situated at a distance R from a reference axis Ai. The movement of this point M rotates about the reference axis Ai and it simultaneously moves in translation along that reference axis. The rotation may be constant or variable. Likewise, the movement in translation may be constant or variable. The distance R may also be constant or variable. The point M is any point of the generator section Si that lies in a reference plane P. The curvilinear path Hi of the flow volume Vi thus does indeed impart a flexuous nature to the channel, at least over the length of this flow volume.

Figure 2B:
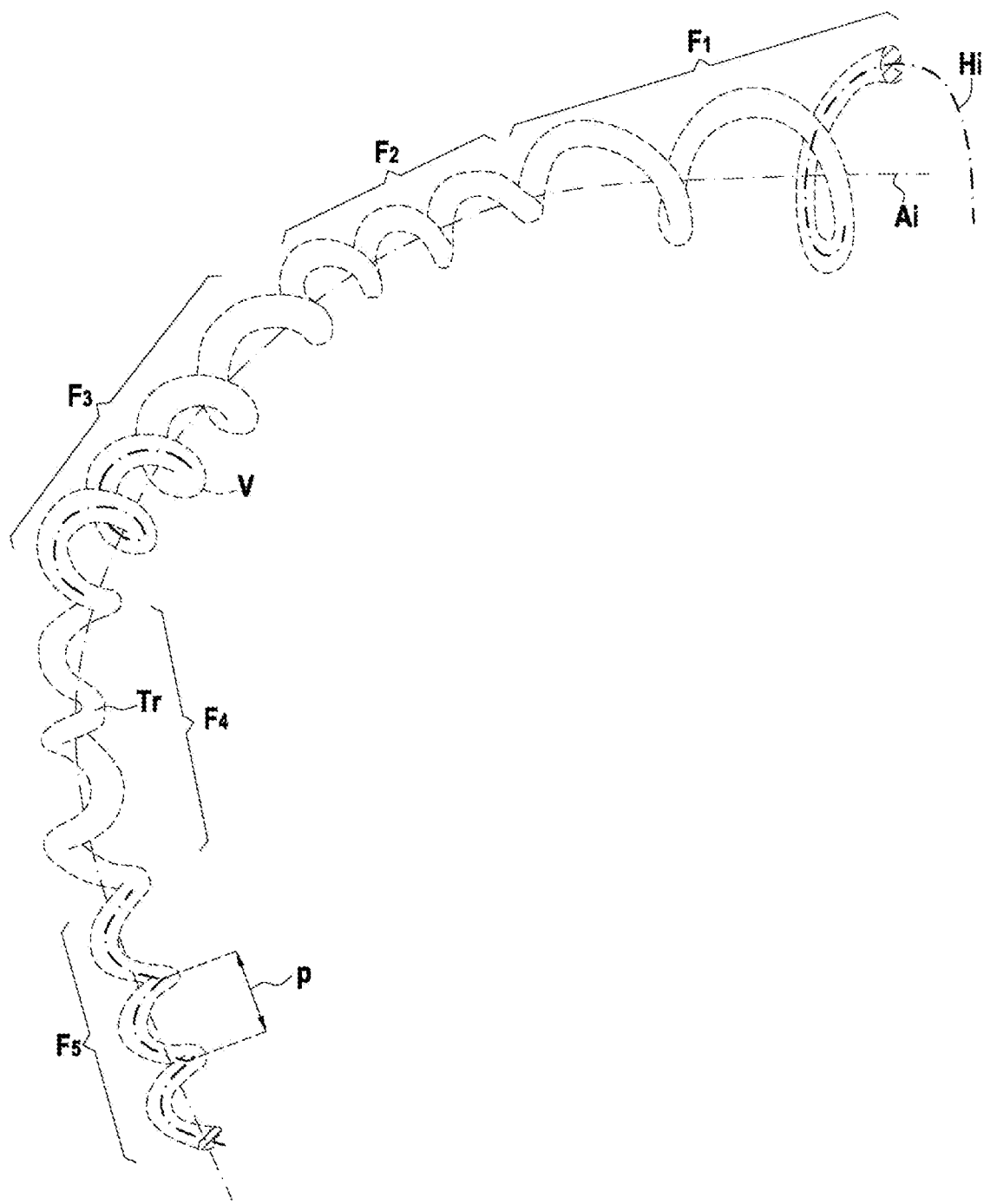
FIG. 2B is a perspective view of a flexuous flow volume in accordance with the invention showing various possible shapes for embodiments referenced F1 to F5 and described elsewhere.

It can be seen from the above description that the flexuous flow volume Vi of the channel may present a very wide variety of geometrical characteristics. As shown in FIG. 2B, the reference axis Ai may be rectilinear and/or curved without any cusp. The reference axis Ai may be rectilinear, along all or a fraction of the length of the flexuous flow volume Vi. Likewise, the reference axis Ai may be curved, over all or a fraction of the length of the flexuous flow volume Vi. This reference axis Ai does not intersect the generator section Si, i.e. it always lies outside the flexuous flow volume Vi. Thus, this reference axis Ai may be tangential to the generator section Si, or it may be spaced apart therefrom by a determined distance that may be variable or constant.

Since the flexuous channel must necessarily be contained within the volume of the porous support 2, it follows that the curvilinear path Hi and the reference axis Ai must themselves be contained inside the volume of the porous support 2.

The curvilinear path Hi may present a very wide variety of geometrical characteristics depending on the values for the distance R, and for the simultaneous movement in rotation and in translation.

Figure 3A:
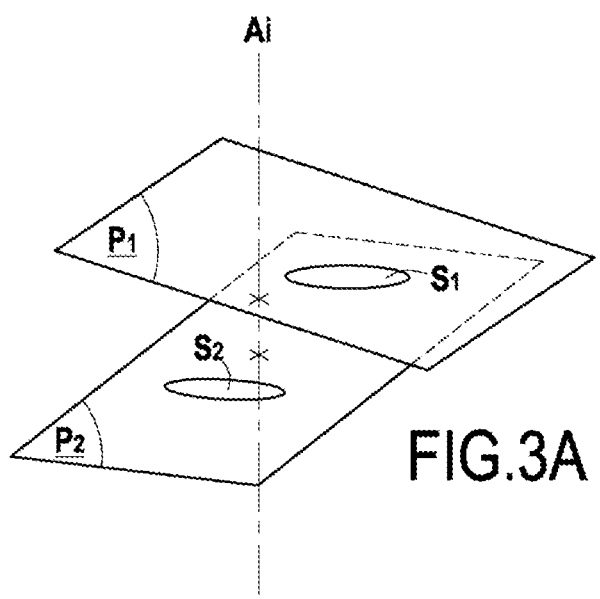
FIG. 3A shows an example of constructing a flexuous flow volume in accordance with the invention in which the plane containing the plane section for generating the volume is inclined at 90° relative to a reference axis.
Figure 3B:
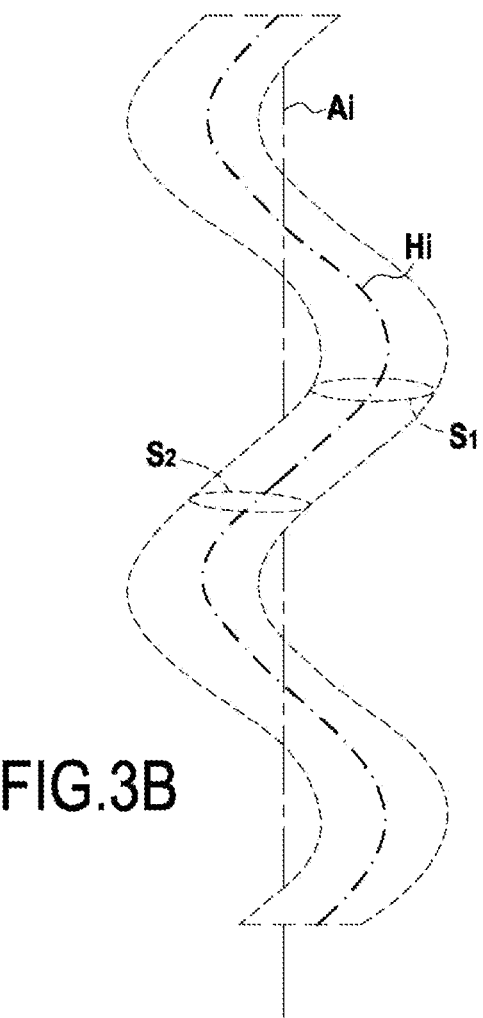
FIG. 3B shows the flexuous flow volume in accordance with the invention obtained using the construction technique shown in FIG. 3A.

The morphology of the flexuous channel depends on the reference axis Ai, on the curvilinear path Hi, and also on the dimensions and on the shape of the generator section Si and on the position of the generator section Si relative to the curvilinear path Hi and to the reference axis Ai. More precisely, FIGS. 3A and 3B show the situation in which a circular section Si contained in a plane perpendicular to the rectilinear reference axis Ai follows a helical path Hi around the reference axis Ai. In this example, the reference plane P containing the circular section Si is perpendicular to the rectilinear reference axis Ai. Rotation of the circular section Si about the rectilinear reference axis Ai in combination with the circular section Si being moved in translation along the rectilinear reference axis Ai enables a flexuous channel to be obtained for which the resulting corkscrew geometrical shape is known under the term "Solomonic" or "barley-sugar" column. FIGS. 3A and 3B show by way of illustration only two circular sections S1 and S2, each contained in a respective plane P1, P2 perpendicular to the rectilinear reference axis Ai.

Figure 4A:
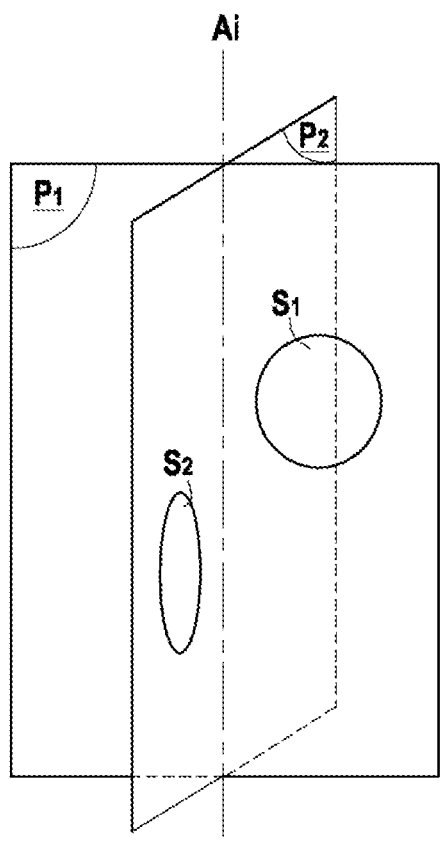
FIG. 4A shows an example of constructing a flexuous flow volume in accordance with the invention in which the plane containing the section for generating the volume also contains the reference axis.
Figure 4B:
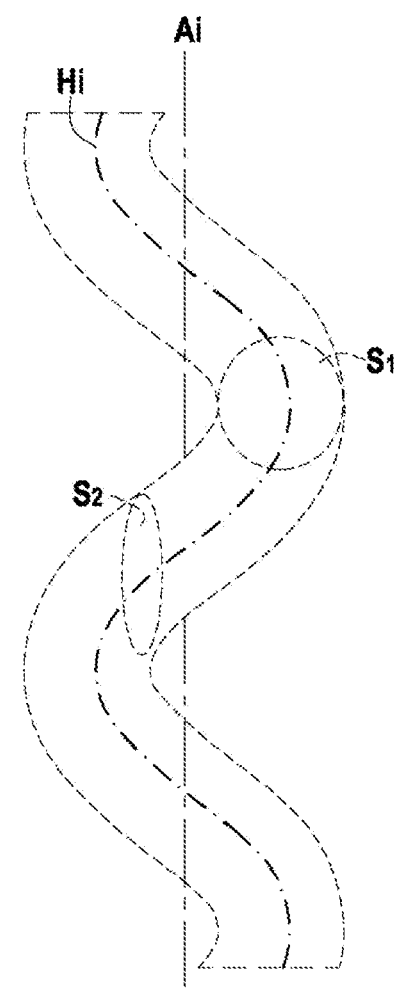
FIG. 4B shows the flexuous flow volume in accordance with the invention that is obtained with the construction technique shown in FIG. 4A.

FIGS. 4A and 4B show the situation in which a circular section Si contained in a reference plane that also contains the rectilinear reference axis Ai follows a helical path Hi around the reference axis Ai. In this example, the reference plane P containing the circular section Si is parallel to the rectilinear reference axis Ai. Rotating the circular section Si around the rectilinear reference axis Ai while also moving the circular section Si in translation along the rectilinear reference axis Ai serves to obtain a flexuous channel for which the resulting spiral staircase shape is known as the "screw of Saint-Gilles". FIGS. 4A and 4B show by way of illustration only two circular sections S1 and S2, each contained in a respective plane P1, P2 parallel to the rectilinear reference axis Ai.

Figure 5A:
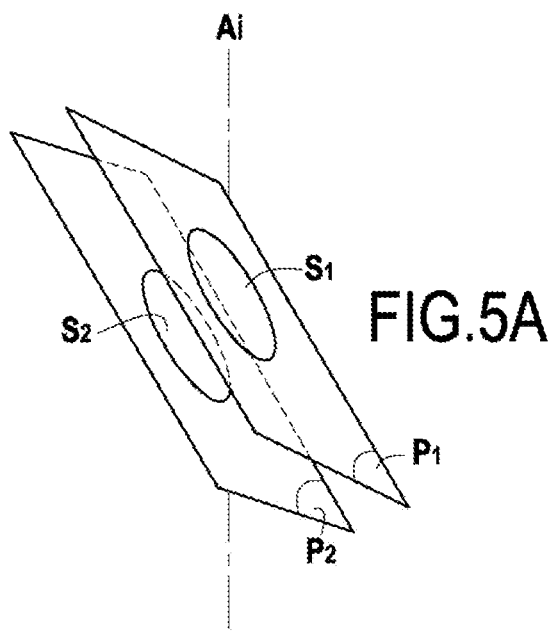
FIG. 5A shows a more general example of construction of a flexuous flow volume in accordance with the invention in which the plane containing the generating plane section presents an angle of inclination relative to the reference axis lying between 0° and 90°, the bounds being excluded.
Figure 5B:
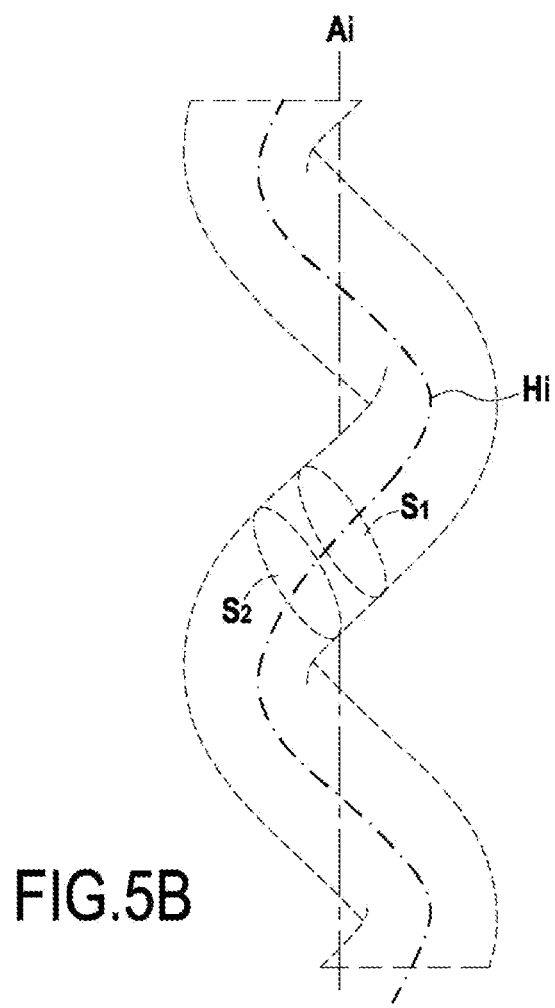
FIG. 5B shows the flexuous flow volume in accordance with the invention obtained using the construction technique shown in FIG. 5A.

FIGS. 5A and 5B show a more general intermediate situation in which a circular section Si contained in a plane presents an angle of inclination lying between 0° to 90° relative to the rectilinear reference axis Ai follows a helical path Hi around the reference axis Ai. Rotating the circular section Si about the rectilinear reference axis Ai while simultaneously moving the circular section Si in translation along the rectilinear reference axis Ai serves to obtain a flexuous channel for which the resulting coil geometrical shape is known as a "serpentine". It is typically the geometrical shape that is obtained when winding a tube around a cylinder. FIGS. 5A and 5B show by way of illustration only two circular sections S1 and S2, each contained in a respective plane P1, P2 that is inclined relative to the rectilinear reference axis Ai.

Table 1 below summarizes the features of these three examples:

| | FIGS. | | |
|---|---|---|---|
| | 3A-3B | 4A-4B | 5A-5B |
| Angle of inclination relative to the reference axis Ai of the plane containing the geometrical section Si | angle of inclination = 90° | angle of inclination = 0° | 0° < angle of inclination < 90° |

In general manner, the pitch $\underline{p}$ or the value of the rotation of the generator section Si about the reference axis Ai may take different values. For a helical path Hi, the value of the rotation of the generator section Si about the reference axis Ai is equal to a multiple of $2\pi$ radians (for a helix having a plurality of turns) or to a fraction of $2\pi$ radians (for a helix having less than one turn).

As can be seen from FIGS. 3A-3B, 4A-4B, and 5A-5B, the curvilinear path Hi shown in those three examples presents a pitch value $\underline{p}$ that is constant. Naturally, the curvilinear path Hi could present a pitch value $\underline{p}$ that is variable since it depends on the values for the movement in rotation and in translation.

The curvilinear path Hi presents a constant pitch $\underline{p}$ over all or a fraction of the length of the flexuous flow volume Vi or a pitch $\underline{p}$ that is variable along all or a fraction of the length of the flexuous flow volume Vi.

In FIG. 2B, the segment F2 shows specifically the situation of a pitch $\underline{p}$ that is not variable while the segment F3 shows specifically the situation of a pitch $\underline{p}$ that is variable.

It should be observed that FIG. 2B shows various other parameters involved in defining the flexuous channel in accordance with the invention. Thus, the segment F4 shows specifically alternation between left-handed and right-handed rotation separated by a straight channel portion Tr, and the segment F5 shows in particular the situation of a section Si of variable morphology, while the segment F1 shows specifically the situation of a variable distance R.

Figure 7:
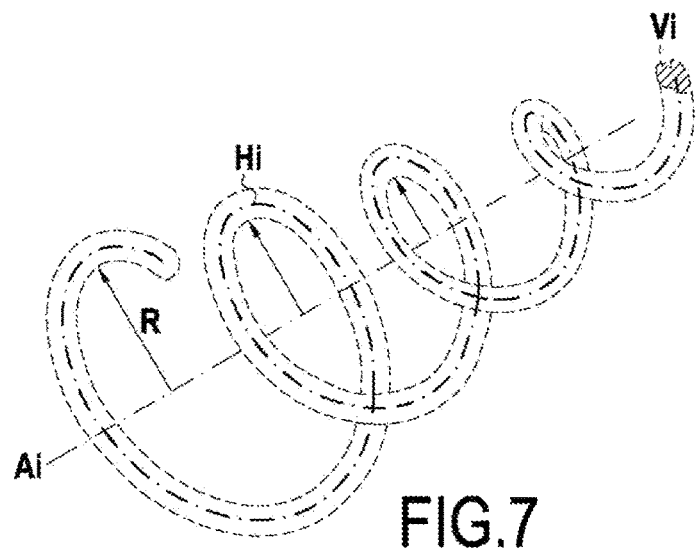
FIG. 7 is a perspective view showing an example of making a flexuous flow volume in accordance with the invention in which the distance between the generating plane section and a reference axis varies.

The reference axis Ai may be spaced apart from the curvilinear path Hi by a distance R that is not variable (FIGS. 3A-3B, 4A-4B, and 5A-5B) over all or a fraction of the length of the flexuous flow volume Vi, or a distance that varies over all or a fraction of the length of the flexuous flow volume Vi, as shown in FIG. 7 where the distance R varies regularly, however it could naturally vary in irregular manner. In this example, the channel follows a helico-spiral path.

It should be recalled that the distance R may be such that the reference axis Ai is tangential to the generator section Si. Although in the example shown in FIGS. 1A to 1D, the reference axis Ai is spaced apart from the generator section S1, it is possible to envisage the generator section S1 being tangential to the reference axis A1, as shown in the example of FIG. 6, which reference axis A1 is also the longitudinal axis of symmetry of the porous support.

Figure 6:
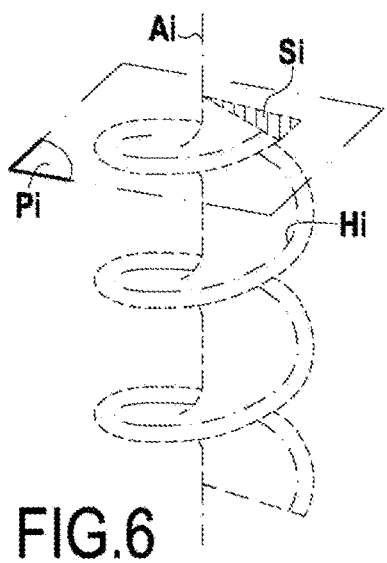
FIG. 6 is a perspective view showing an example of making a flexuous flow volume in accordance with the invention in which the distance between the generating plane section and a reference axis is such that the reference axis is tangential to the generating section.

It should be observed that FIG. 6 shows the particular situation in which the plane containing the plane section Si for generating the volume (in this example a triangle) is inclined at an angle of 90° relative to a tangential reference axis Ai (in this example one of the vertices of the triangle) to said triangular generator plane section. This figure shows the situation in which a triangular plane section Si contained in a plane Pi perpendicular to the rectilinear reference axis Ai follows a helical path Hi about the reference axis Ai tangential to said triangular generator plane section. Rotation of the triangular section about the rectilinear reference axis Ai, which it touches in this example at one point, combined with movement of this triangular section Si in translation along the rectilinear reference axis Ai serves to obtain a flexuous channel presenting a geometrical shape that is known as an "Archimedes' screw". It should be observed that a flexuous channel is obtained of geometrical shape that is also known as an "Archimedes' screw" both in the special situation in which the plane containing the plane section for generating the volume is parallel to a reference axis Ai that is tangential at one or more points to said generator plane section, and also in the more general situation in which the plane containing the plane section for generating the volume is inclined at an arbitrary angle relative to a reference axis Ai that is tangential at a point to said generator plane section.

The curvilinear path Hi is said to be helical when simultaneously the pitch p and the distance R are constant (FIGS. 3B, 4B, 5B). This curvilinear path Hi may turn about the reference axis Ai over all or a fraction of the length of the flexuous flow volume Vi in the counterclockwise direction (right-handed) and/or in the opposite direction (left-handed). Thus, the curvilinear path Hi may be established in a single direction, or it may alternate in two opposite directions along segments that may be selected to be of lengths that are equal or different.

Figure 8:
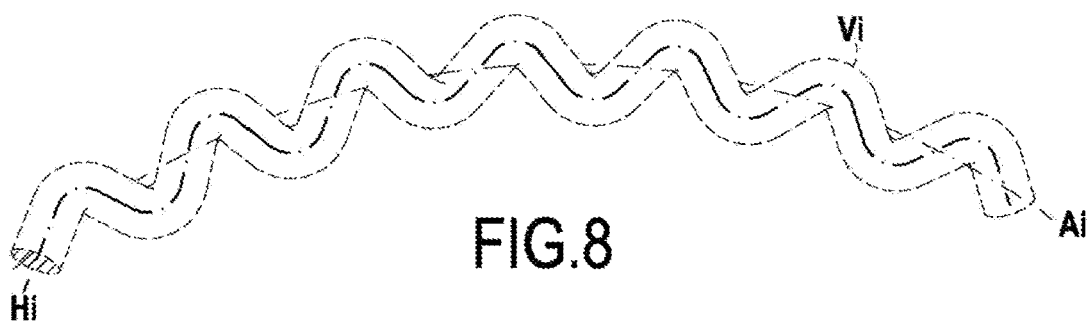
FIG. 8 is a perspective view showing an example of making a flexuous flow volume in accordance with the invention in which the distance between the generating plane section and a reference axis is constant while the pitch is also constant and the reference axis is curvilinear.

In the example shown in FIG. 8, the generator section follows a helical path Hi in the right-handed direction with a constant pitch p about a curvilinear reference axis Ai.

Figure 9A:
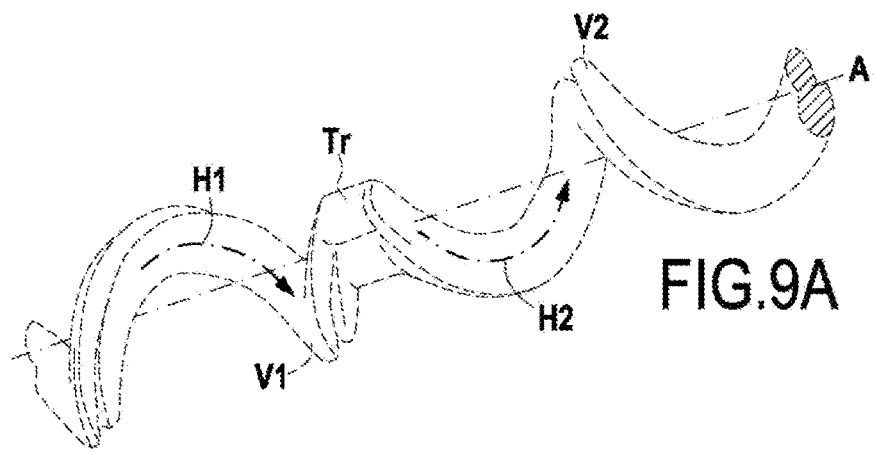
FIG. 9A is a perspective view showing an example of making a flexuous flow volume in accordance with the invention in which the left-handed path is connected to a right-handed path by a rectilinear path parallel to the reference axis.
Figure 9B:
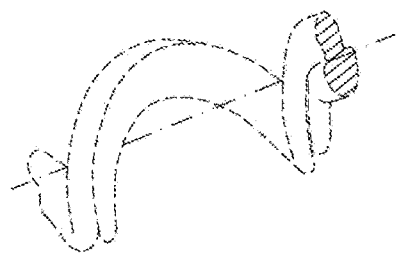
FIG. 9B is a cross-section view showing the flexuous flow volume embodiment in accordance with FIG. 9A.
Figure 10A:
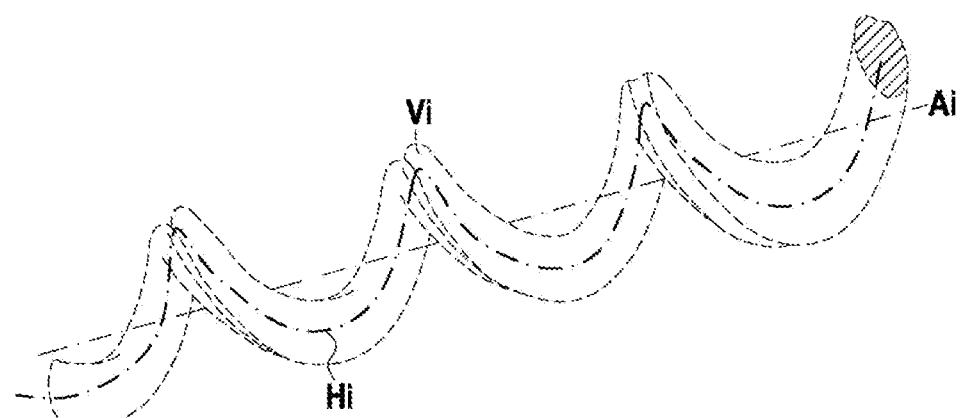
FIG. 10A is a perspective view showing an embodiment of a flexuous flow volume in accordance with the invention, in which the shape of the generating section varies.
Figure 10B:
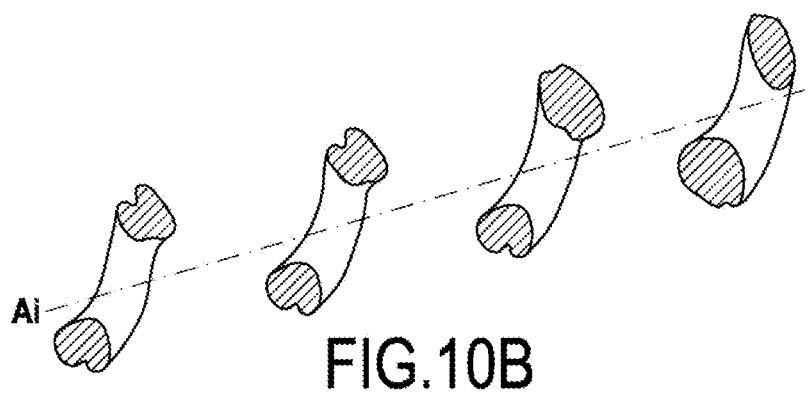
FIG. 10B is a view on a longitudinal section plane containing the reference axis showing an embodiment of the flexuous flow volume in accordance with FIG. 10A.

In the example shown in FIGS. 9A-9B, the left-handed path H1 is connected to a right-handed path H2 by a rectilinear path Tr parallel to the reference axis Ai, whereas in the example shown in FIGS. 10A-10B, the path H1 is left-handed and is connected directly to a left-handed path H2.

Figure 12A:
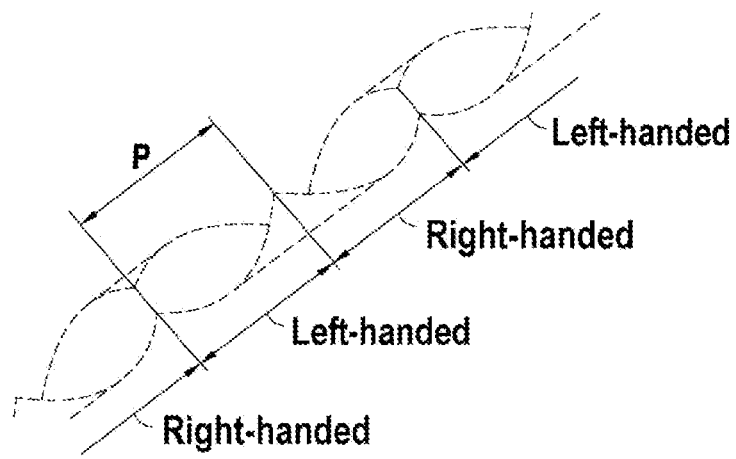
FIG. 12A is a perspective view showing that portion of a flexuous flow volume in accordance with the invention for which segments of left-handed path alternate directly with segments of right-handed path.
Figure 12B:
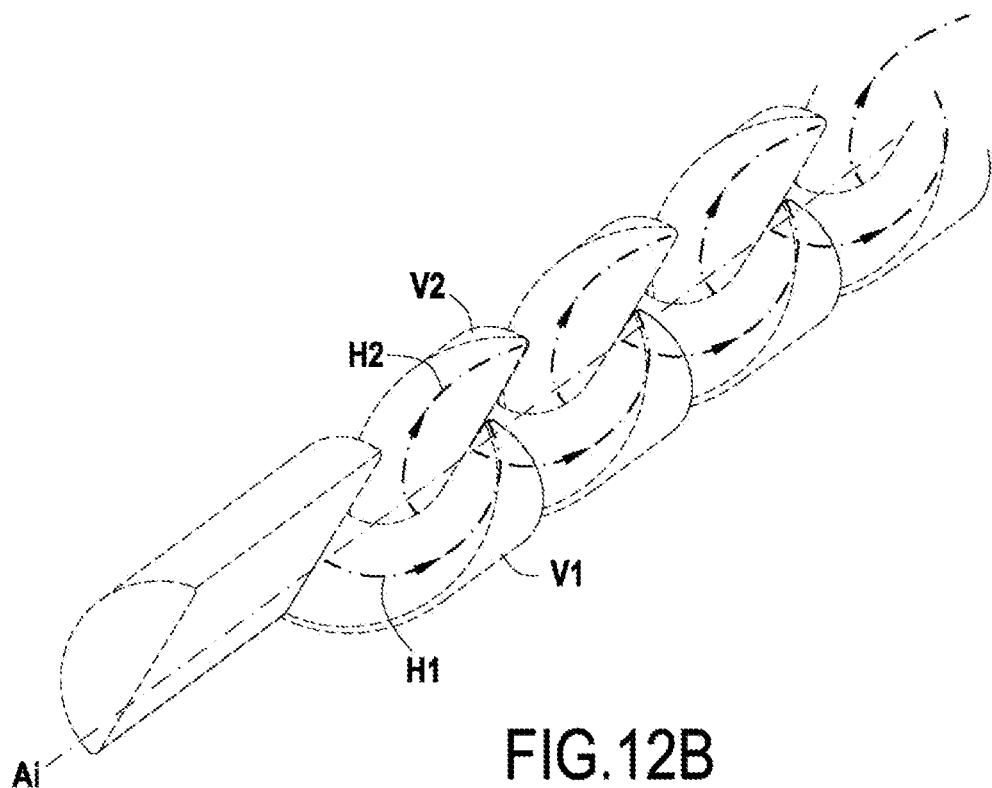
FIG. 12B is a perspective view showing the embodiment of the flexuous flow volume in accordance with FIG. 12A.

Advantageously, the curvilinear path Hi alternates between being right-handed and left-handed on segments that may be of the same length, for example (FIGS. 12A-12B).

The generator section Si of this flexuous flow volume Vi may present profiles of any type.

The morphology or the shape of the generator section Si may be constant along all or a fraction of the length of the flexuous flow volume Vi or it may vary along all or a fraction of the length of the flexuous flow volume Vi. By way of non-limiting example, the morphology of the generator section Si for this flow volume may be polygonal, circular, semi-circular, or oblong. FIGS. 10A-10B show the situation in which the morphology of the generator section Si varies.

Figure 11A:
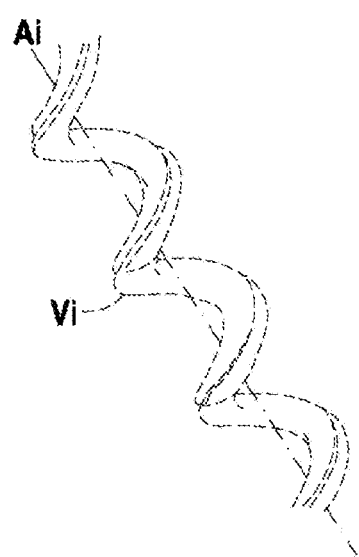
FIG. 11A is a perspective view showing an embodiment of a flexuous flow volume in accordance with the invention, for which the area of the generating section varies.
Figure 11B:
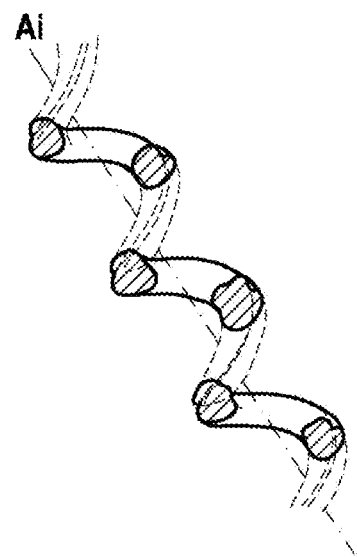
FIG. 11B is a view on a longitudinal section plane containing the reference axis showing the embodiment of the flexuous flow volume in accordance with FIG. 11A.

The area of the generator sector Si may be constant along all or a fraction of the length of the flexuous flow volume Vi or it may vary along all or a fraction of the length of the flexuous flow volume Vi. FIGS. 11A-11B show the situation in which the area of the generator section Si varies.

The features of the example flexuous volumes shown in the above figures are summarized in Table 2 below:

|  |  | 3A 4A 5A | 7 | 8 | 9A | 10A | 11A | 12A |
|---|---|---|---|---|---|---|---|---|
| Reference axis Ai | rectilinear | X | X |  | X | X | X | X |
|  | curvilinear |  |  | X |  |  |  |  |
| Morphology of the generator section Si | constant | X | X | X | X |  | X | X |
|  | variable |  |  |  |  | X |  |  |
| Area of the generator section Si | constant | X | X | X | X | X |  | X |
|  | variable |  |  |  |  |  | X |  |
| Distance R | constant | X |  | X |  | X | X | X |
|  | variable |  | X |  | X |  |  |  |
| Pitch p | constant | X | X | X | X | X | X | X |
|  | variable |  |  |  |  |  |  |  |
| Helical path Hi |  |  | X |  | X | X | X | X |
| Right-handed flexuous channels |  | X |  | X | X | X | X | X |
| Left-handed flexuous channels |  |  |  |  | X |  |  | X |
| Straight channel segment |  |  |  |  | X |  |  |  |
| Reversal(s) of direction of rotation |  |  |  |  | X |  |  | X |

The description below gives preferred but non-limiting embodiments of porous supports 2 including channels 4i with flexuous flow volumes Vi in accordance with the invention.

In the example shown in FIGS. 1A to 1D, the generator section S1 is a portion of a disk and the reference axis A1 is a straight line coinciding with the longitudinal axis of symmetry of the porous support. The curvilinear support H1 is helical, i.e. the distance R between the curvilinear path H1 and the reference axis A1 is constant, as is the helical pitch p, which is constant. The reference axis A1 does not pass through the generator sector S1 that, in the example shown, lies at a distance from the axis. Naturally, the generator section S1 could be tangential to the reference axis A1.

The flexuous flow volume V1 of the channel $4_1$ extends between the inlet 6 and the outlet 7 of the channel along a fraction only of the length of the channel. As can be seen more clearly in FIG. 1B, the flexuous flow volume V1 of the channel is arranged over a length L of the porous support 2 that is shorter than the total length of the porous support.

According to an advantageous embodiment characteristic, the generator section S1 taken over a limited portion relative to the inlet 6 and the outlet 7, follows a path that results from movement in translation parallel to the reference axis A1. Going from the inlet 6 and the outlet 7, the channel $4_1$ thus has respective rectilinear inlet and outlet flow volumes Ve and Vs parallel to the reference axis A1 and in communication with the flexuous flow volume V1 of the channel. Thus, between its inlet 6 and its outlet 7, the channel $4_1$ presents an inlet flow volume Ve, a flexuous flow volume V1, and an outlet flow volume Vs.

In the example shown in FIGS. 13A to 13E, the porous support 2 is of tubular shape and circular section, and it includes two channels $4_1$ and $4_2$. These two channels present generator sections S1 and S2 that are separated from each other by a separating partition 11. These generator sections S1 and S2 present identical shapes as portions of disks having areas that are likewise identical.

Each channel $4_1$ and $4_2$ presents a flexuous flow volume V1, V2 extending along a helical curvilinear path H1, H2 that turns about a reference axis A1, A2. The curvilinear paths H1, H2 that present identical constant pitch are parallel to each other. The reference axes A1 and A2 coincide along a common straight line advantageously corresponding to the longitudinal axis of symmetry of the porous support. Each curvilinear path H1, H2 is spaced apart from the reference axis A1, A2 by the same constant distance R, such that the channels extend symmetrically relative to the common reference axis and are nested in one another.

In the example shown in FIGS. 13A to 13E, the two channels possess paths that are parallel, however it is clear that a series could be provided having a plurality of channels greater than two with paths that are parallel or indeed not parallel. If not parallel, the channels naturally also present generator sections that are spaced apart from the reference axis Ai by distances R suitable for ensuring that they are separated from one another by separating partitions 11.

In manner analogous to the embodiment shown in FIGS. 1A to 1D, the flexuous flow volumes V1, V2 of the channels extend between the inlet 6 and the outlet 7 of the channel over only a fraction of the length of the channel. Thus, each channel $4_1$ and $4_2$ presents respectively, going from its inlet 6 to its outlet 7, an inlet flow volume Ve of rectilinear path, its flexuous flow volume V1, V2, and an outlet flow volume Vs of rectilinear path, it being understood that in the invention no particular flow direction is imposed and the inlet and the outlet can equally well be interchanged.

In the example shown in FIGS. 13A to 13E, the porous support 2 has two channels $4_1$ and $4_2$, however it is clear that it could have a greater number of channels arranged optionally symmetrically around an optionally common reference axis, the channels being separated from one another by separating partitions 11.

Figure 14A:
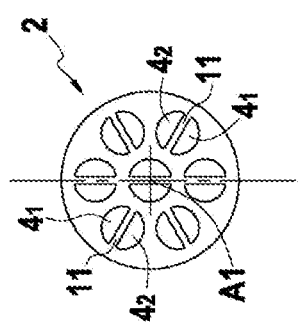
FIG. 14A is an end view of a support provided with pairs of channels duplicated seven times, each pair being in accordance with FIGS. 13A to 13E.
Figure 14B:
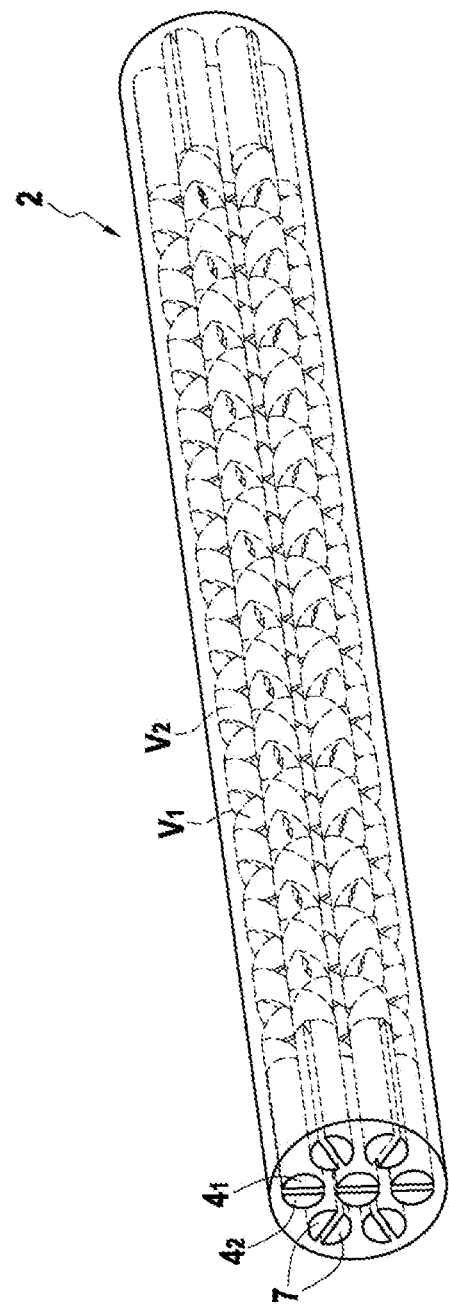
FIG. 14B is a perspective view showing the flexuous flow volumes in accordance with the invention as shown in FIGS. 13A to 13E, duplicated seven times within a single support.
Figure 15A:
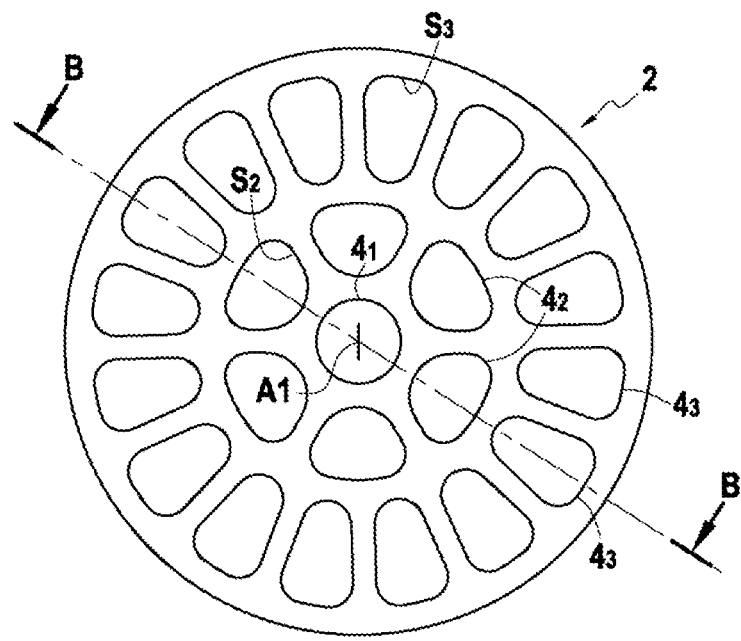
FIG. 15A is an end view of a support provided with twenty-three channels made up of three categories of channel.
Figure 15B:
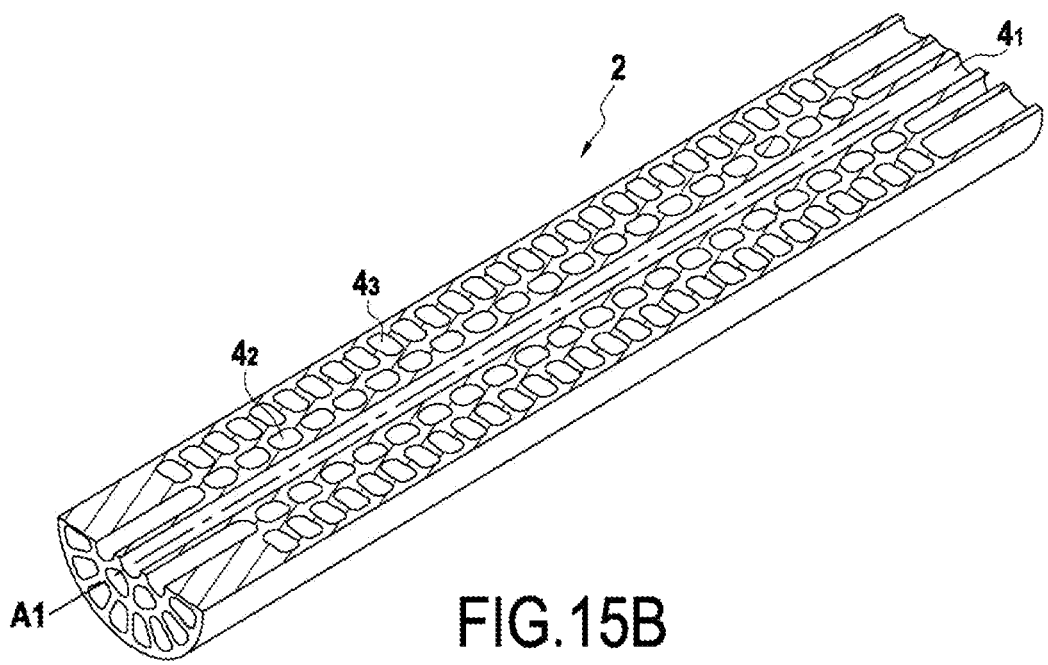
FIG. 15B is a longitudinal section view of the support on lines B-B of FIG. 15A.

It should be observed that this structure of nested channels $4_1$ and $4_2$ can be duplicated as in the example shown in FIGS. 14A and 14B, in which the porous support 2 has a series of seven structures, each comprising two channels $4_1$ and $4_2$ as described in FIGS. 13A to 13E. In this embodiment shown in FIGS. 14A and 14B, the porous support 2 thus has fourteen channels, but it is clear that provision could be made for a porous support to have some other number of channels.

Figure 15C:
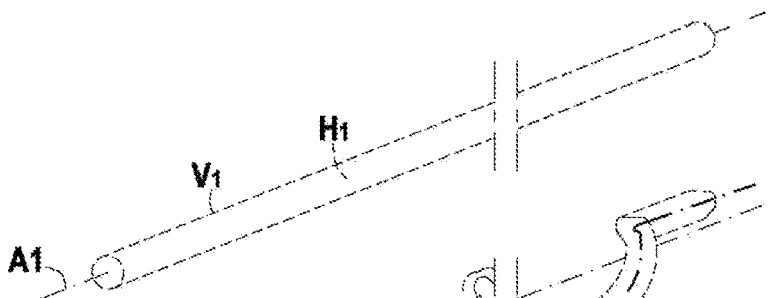
FIG. 15C is a perspective view showing the flow volume of the central channel shown in FIG. 15A.

In the embodiment shown in FIGS. 15A to 15H, the porous support 2 has twenty-three channels 4 subdivided into three categories that are arranged concentrically from the center to the periphery of the porous support. In this embodiment, the porous support 2 is tubular in shape and circular in section, and in a first category it has a central channel $4_1$ that is rectilinear and centered on the longitudinal axis of symmetry A1 of the porous support 2. This central channel $4_1$ has a flow volume V1 that does not present the flexuous characteristic in accordance with the invention (FIG. 15C).

Figure 15D:
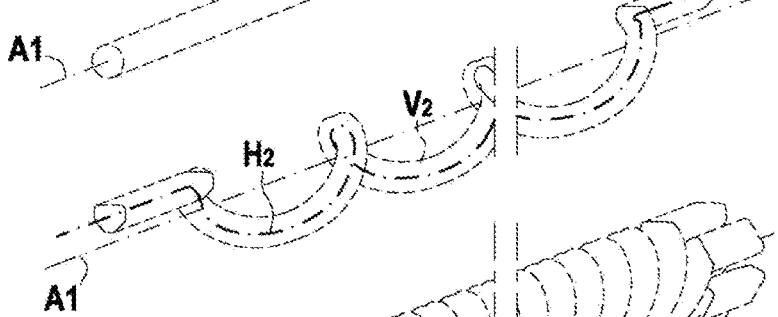
FIG. 15D is a perspective view showing the flexuous flow volume in accordance with the invention for one of the six channels belonging to the intermediate category.

In a second category, referred to as an intermediate category, the porous support 2 presents a series of six channels $4_2$ arranged in a ring centered on the longitudinal axis of symmetry A1 of the porous support 2. The channels $4_2$ present generator sections S2 that are identical in shape and area. In the example, each generator section S2 presents a general shape that is not circular. Each channel $4_2$ presents a flexuous flow volume V2 extending along a helical curvilinear path H2 of constant pitch and of constant distance R, the curvilinear path H2 turning about a reference axis corresponding to the longitudinal axis of symmetry A1 (FIG. 15D).

Figure 15E:
FIG. 15E is a perspective view showing the flexuous flow volumes in accordance with the invention for the six channels belonging to the intermediate category and surrounding the central channel.

Each flexuous flow volume V2 is located at a distance around the central channel $4_1$. As can be seen in FIG. 15E, the flexuous flow volumes V2 of the set of channels $4_2$ in the intermediate category extend along helical curvilinear paths H2 with identical pitches and identical distances R about a reference axis corresponding to the longitudinal axis of symmetry A1. The six channels $4_2$ extend symmetrically relative to the common reference axis A1 and they are nested among one another.

In manner analogous to the embodiment shown in FIGS. 1A to 1D, the flexuous flow volumes V2 of the channels extend between the inlet 6 and the outlet 7 of the channel over a fraction only of the length of the channel. Thus, each channel $4_2$ in the intermediate category presents, between its inlet 6 and its outlet 7, an inlet flow volume Ve following a rectilinear path, the flexuous flow volume V2, and an outlet flow volume Vs following a rectilinear path.

Figure 15F:
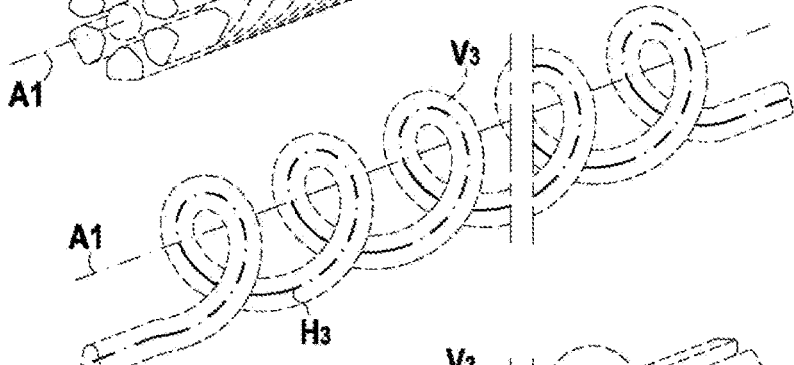
FIG. 15F is a perspective view showing the flexuous flow volume in accordance with the invention for one of the sixteen channels belonging to the peripheral category.
Figure 15G:
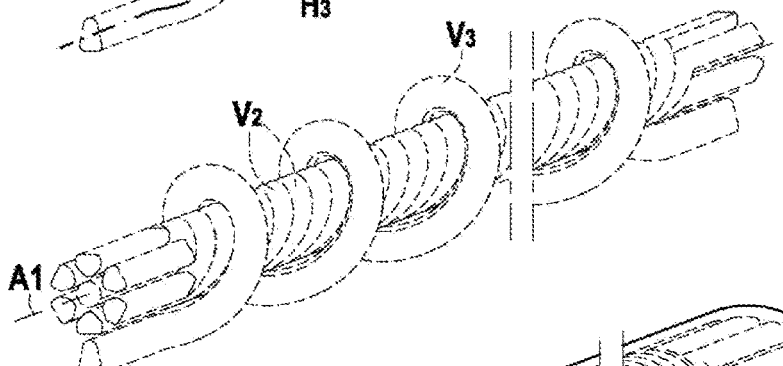
FIG. 15G is a perspective view showing the flexuous flow volumes in accordance with the invention for one of the sixteen peripheral channels surrounding the channels of the intermediate category.

In a third category, referred to as "peripheral", the porous support 2 presents a series of sixteen channels $4_3$ arranged in a ring centered on the longitudinal axis of symmetry A1 of the porous support 2 and extending concentrically around the ring channels $4_2$ of the second category. The channels $4_3$ in this third category present generator sections S3 that are identical in shape and area. In this example, each generator section S3 is generally in the shape of an isosceles trapezoid. Each channel $4_3$ presents a flexuous flow volume V3 extending along a helical path H3, with this curvilinear path H3 turning about a reference axis corresponding to the longitudinal axis of symmetry A1 (FIG. 15F). Each flexuous flow volume V3 is located at a distance around the channels $4_2$ of the second category. As can be seen in FIG. 15G, the flexuous flow volumes V3 of the channels $4_3$ of the third category extend along helical curvilinear paths H3 that are identical in pitch and in radius of gyration about a reference axis corresponding to the longitudinal axis of symmetry A1. The sixteen channels $4_3$ extend symmetrically relative to the common reference axis A1, and they are nested among one another.

In analogous manner to the example shown in FIGS. 1A to 1D, the flexuous flow volume V3 of each channel extends between the inlet 6 and the outlet 7 of the channel over a fraction only of the length of the channel. Thus, each channel $4_3$ in the peripheral category presents respectively, between its inlet 6 and its outlet 7, an inlet flow volume Ve following a rectilinear path, the flexuous flow volume V3, and an outlet flow volume Vs following a rectilinear path.

Figure 15H:
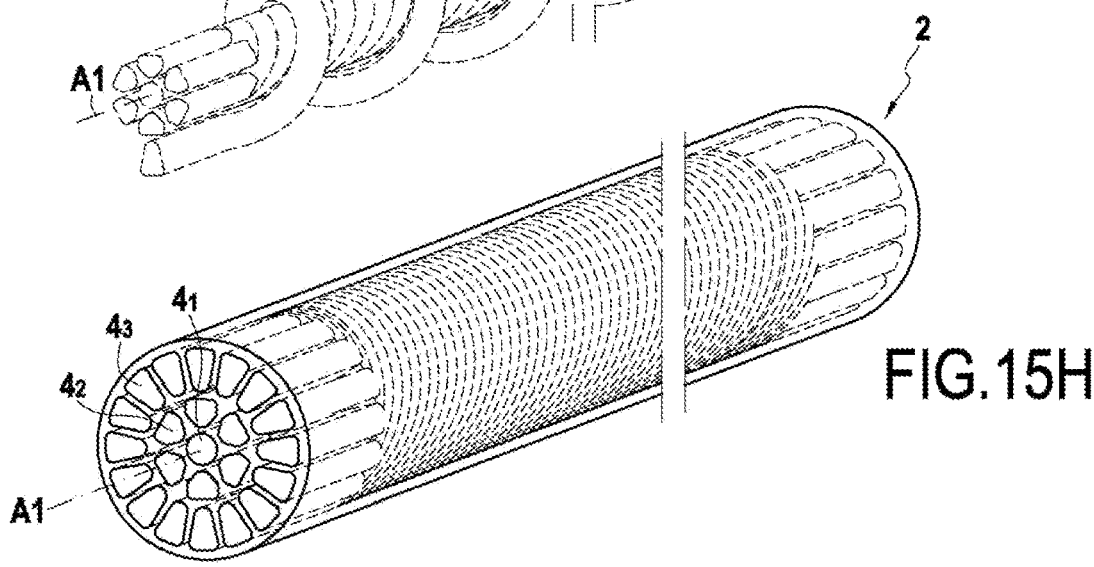
FIG. 15H is a perspective view showing, within a single support, the flexuous flow volumes in accordance with the invention for twenty-two channels surrounding a central channel, as shown in FIGS. 15D to 15G.

FIG. 15H shows a porous support 2 having arranged therein the channels $4_1$, $4_2$, and $4_3$ of the three categories and presenting flexuous flow volumes as described in FIGS. 15C to 15G. Naturally, the invention may be implemented with a porous support having some other number of channels distributed in some other number of categories.

Digital simulations of the computational fluid dynamics (CFD) type as applied to the embodiment shown in FIGS. 13A to 13E have given the following results in terms of performance and energy consumption when compared with straight channels having the same hydraulic diameter. These are results of simulations made using a digital model established on the basis of experimental measurement results obtained by causing red wine to flow as the fluid for treatment in a single rectilinear circular channel with a transmembrane pressure of 1.5 bar and a cutoff threshold of 0.2 μm.

In Table 3 below, the ratio Qp/Qa expressed in % between the permeate volume flow rate Qp (in cubic meters per hour ($m^3$/h)) and the volume flow rate Qa ($m^3$/h) with which the fluid for treatment is fed reveals the intrinsic performance of flexuous channels compared with rectilinear channels having the same hydraulic diameter (Dh) for the same transmembrane pressure (TMP) and the same cutoff threshold (μm).

The energy efficiency of the filter unit within which the filtration elements having flexuous channels of this type is itself expressed in terms of cubic meters of permeate extracted per kilojoule of energy needed to cause the fluid for treatment to flow in the channel ($m^2$/KJ). The mean speed (in meters per second (m/s)) in the corresponding channels is given in Table 3 by way of indication.

| Dh = 3 mm-TMP = 1.5 bar - cutoff threshold of the active layer = 0.2 µm | Qp/Qa (%) | m³/KJ | m/s |
|---|---|---|---|
| Filtration element with rectilinear channels | 0.5 | $7.3 \times 10^{-5}$ | 6.0 |
| Filtration element with flexuous channels of the invention in accordance with FIGS. 1A to 1D with a pitch of 24 mm | 8.5 | $37 \times 10^{-5}$ | 1.6 |
| Filtration element with flexuous channels of the invention in accordance with FIGS. 1A to 1D with a pitch of 12 mm | 13.13 | $59 \times 10^{-5}$ | 0.9 |

For this example of helical flexuous channels as shown in FIGS. 1A to 1D, the results given in this table show that, in comparison with a filtration element having rectilinear channels with the same hydraulic diameter:

when the helical pitch is 24 mm, the intrinsic performance of the filtration element is multiplied by 17 and its energy efficiency is multiplied by 5 compared with a filtration element having rectilinear channels; and when the helical pitch is 12 mm, the intrinsic performance of the filtration element is multiplied by 26 and its energy efficiency is multiplied by 8.

According to an advantageous characteristic of the invention, the flexuous channels 4$i$ in accordance with the invention may present a pitch $p$ of value that is independent from the value of the distance R between the curvilinear path H1 and the reference axis A1. It is thus possible to make flexuous channels with a pitch $p$ of small value combined with a small value for the distance R. Typically, provision can be made for flexuous channels presenting a pitch $p$ lying in the range 1 mm to 250 mm to be associated with a distance R lying in the range 0.1 mm to 100 mm. Furthermore, according to an advantageous characteristic, the flexuous channels of the invention present hydraulic diameters lying in the range 0.5 mm to 20 mm. It should be recalled that the hydraulic diameter Dh is such that Dh=4A/P where A is the area of the flow section of the channel and P is the wetted perimeter of that section.

Advantageously, each channel possesses a hydraulic diameter that may be constant or variable.

In the context of the invention, the porous support 2, or indeed the entire cross-flow separation element, is fabricated using an additive technique. The method of the invention consists in making the three-dimensional structure of the support by forming superposed individual plies that are bonded successively to one another so as to cause the three-dimensional structure of the support to grow progressively.

Compared with prior art techniques, this technique has the advantage of making the support in a single production step that does not require tooling or machining and thus of giving access to a greater range of support shapes and making it possible to vary the shapes and the dimensions of the obstacles in the channels.

When using a solid material such as a powder, the thickness of the bed of powder and thus of each successively consolidated ply is relatively small so as to enable it to bond with the underlying ply, by applying energy or by spraying liquid. In particular, powder is deposited with a thickness in the range 20 µm to 200 µm, which thickness is a function of the additive technique that has been selected.

It is repeating the binary sequence, ply after ply, that makes it possible to build up the desired three-dimensional shape. The pattern of consolidation can vary from one ply to the next. The desired three-dimensional shape is grown along a selected growth direction.

The grain size of the deposited powder is one of the factors that determines the minimum thickness for each bed of powder, and it also determines the finally-obtained mean pore diameter. In particular, a powder is used comprising material that is to constitute the support, e.g. a metal oxide powder, or a powder for one of its precursors. By way of example, the deposited powder may present a mean grain size of about 35 µm in order to obtain a mean pore diameter in the ceramic support of about 10 µm.

The Applicant has observed that it is possible to obtain and control an interconnected residual pore texture within the consolidated monolithic material by adjusting various parameters such as the material that is selected, and for a given material, the mean grain size of the powder used, and for given material and grain size, the thickness of the powder bed that is repeated layer after layer, and also by adjusting the settings of the various parameters specific to the technology selected for consolidation purposes. The residual porous texture is the result of sintering or of controlled adhesive bonding of the powder grains so as to leave interconnected voids between the grains.

When using an energy beam, the main parameters on which it is possible to act are its focus, i.e. the diameter of the beam where it impacts the powder bed, the speed with which the powder bed is scanned by the beam of photons or electrons, or indeed the amount of overlap between the surfaces impacted by the energy beam while building up a ply.

When using liquid spray, the main parameters on which it is possible to act are the weight of the droplets, their frequency, the speed with which the powder bed is scanned by the "jet" of droplets, or indeed the amount of overlap between passes.

The Applicant has also observed that by modulating the various parameters described above, it is possible to adjust the distribution of pore sizes, and for each given pore population, it is possible to control the number of pores and their tortuosity.

Once the powder has agglomerated in the selected zones, the non-agglomerated powder material grains are removed by any appropriate technique, with this operation being facilitated by the initial fluidity of the powder used. It is possible to use air-flow techniques (suction) or water-flow techniques, or indeed vibration in order to remove the last traces of powder remaining in the flexuous channels or on the walls of the shapes that have been made.

Final consolidation of the filter and the final state of the porous texture are usually obtained by one or more subsequent heat treatments setting out to eliminate binders (debinding) and/or sintering proper of the material. The temperature selected for such final sintering depends on the nature of the inorganic material used and on the mean size of the powder grains used.

The support, or indeed the cross-flow separation element as a whole, is thus built up ply after ply. For this purpose, upstream, and by using computer assisted design software, the three-dimensional structure of the support or of the cross-flow separation element that is to be made is subdivided into slices. The virtual three-dimensional object that is to be made is thus subdivided into two-dimensional slices of very small thickness. These thin slices are then made one by one in the form of superposed individual plies, and they are bonded to one another so as to cause the desired three-dimensional shape to grow progressively.

This three-dimensional structure is made:
either by repeating the following steps:
making a bed of solid material (organic or inorganic powder) or of liquid material (organic precursor or liquid having dispersed therein a powder, which may be organic or inorganic) that is to form the porous support, the bed being of constant thickness and occupying an area that is greater than the section of said porous support at the level of the ply; and
consolidating a portion of the material in localized manner in compliance with a determined pattern for each ply so as to create the individual ply, while simultaneously bonding the resulting individual ply to the preceding ply;
or by creating successive beads of material formed by melting an organic or inorganic powder projected into the beam of a laser and in compliance with the predetermined pattern for each ply;
or else by melting a strand of a hot-melt solid precursor continuously or discontinuously (drop by drop). When the precursor is a hot-melt organic polymer used on its own, the support is of organic nature and can be used immediately for depositing a layer of organic nature. When the precursor is a mixture of a hot-melt organic polymer and a ceramic or metal inorganic powder, and once the polymer used as a binder has been eliminated and the grains of the inorganic powder have been sintered, the support is of an inorganic nature.

In general manner, in the first situation, the material used is either solid or liquid and the individual plies are consolidated by applying energy or by spraying a liquid in fine droplets. The localized delivery of energy may be performed with a directed light beam (LED or laser) or with a directed electron beam, or indeed with any energy source that can be focused and scanned on the bed of powder in compliance with the pattern selected by CAD. Interaction between energy and material then leads either to sintering, or else to melting and solidifying of the material, or indeed to photo-polymerization or photo-curing of the material, depending on its nature and on the nature of the energy source used.

Liquid may be delivered onto a powder bed in localized manner using microdroplets that are created with a piezo-electric system, which droplets may optionally be charged and guided in an electromagnetic field. The liquid is then a binder of an agent for activating a binder that has already been added to the ceramic powder.

The use of an additive technique as envisaged in the context of the invention, and in comparison with prior art techniques, makes it possible to obtain firstly an improvement in terms of production throughput and reliability, and secondly to obtain great variability concerning the shapes that may be selected for the support and for the shapes and portions in relief that can be made in the channel(s) inside the support.

In the context of the invention, in order to design the three-dimensional shape, various additive techniques may be used, such as for example: selective laser sintering (SLS) or selective laser melting (SLM); 3D printing or binder jetting; lithograpy-based ceramic manufacturing (LCM); fused deposition modeling (FDP); and/or stereolithography apparatus (SLA).

In the context of the invention, separation elements are provided for separating a fluid medium by cross-flow filtration, commonly referred to as filtration membranes. Such a separation element comprises a porous support made of a material that may be organic or inorganic.

For an organic porous support, provision may be made to select from among the following organic materials, given as non-limiting examples: polyamide, polyetherketoneketone, polystyrene, alumide, polyphenylsulfone, fluorinated thermoplastic elastomers, polypropylene, polyethylene, epoxy, acrylate, acrylonitrile butadiene styrene, polymethyl methacrylate, polycarbonate, nylon, polyetherimide, acrylonitrile styrene acrylate, polylactic acid, polyvinyl chloride, and mixtures thereof.

For a non-metallic (ceramic) inorganic porous support, provision may be made to select from among the following inorganic materials, given as non-limiting examples: aluminum oxide, titanium oxide, zirconium oxide, aluminum titanate, aluminum nitride, titanium nitride, boron nitride, silicon nitride, sialon, graphite carbon, silicon carbide, tungsten carbide, and mixtures thereof.

For a metallic (metals and alloys) inorganic porous support, provision may be made to select from among the following metallic materials, given as non-limiting examples: aluminum, alloys of aluminum, alloys of cobalt and chromium, alloys of nickel, alloys of nickel and chromium, steels and stainless steels, titanium, alloys of titanium, alloys of copper and tin, alloys of copper, tin, and aluminum, alloys of copper and zinc, and mixtures thereof.

The invention claimed is:

1. A cross-flow separation element for separating a fluid medium into a filtrate and a retentate, comprising:
single-piece rigid porous support;
at least one channel contained within the support, the channel being fully laterally enclosed by channel walls and having an inlet opening formed in a first end of the support, and an outlet opening formed in a second end of the support;
wherein the channel extends in a flexuous path around a reference axis contained within the volume of the support, the channel walls having a shape defined by sweeping a generator plane section along a curvilinear path around said reference axis; and
wherein the channel does not intersect the reference axis.

2. The cross-flow separation element according to claim 1, wherein the channel extends in the flexuous path along an entire length of the support, or over a portion of the entire length of the support.

3. The cross-flow separation element according to claim 1, comprising a plurality of channels.

4. The cross-flow separation element according to claim 1, wherein at least one of the cross-sectional area of the channel and the shape of the channel is constant.

5. The cross-flow separation element according to claim 1, wherein at least one of the cross-sectional area of the channel and the shape of the channel is variable.

6. The cross-flow separation element according to claim 1, wherein the channel is spaced apart from the reference axis by a constant distance.

7. The cross-flow separation element according to claim 6, wherein the channel is spaced apart from the reference axis by a variable distance.

8. The cross-flow separation element according to claim 1, wherein the reference axis is tangential to the channel.

9. The cross-flow separation element according to claim 1, comprising at least two channels nested in one another.

10. The cross-flow separation element according to claim 1, wherein the channel extends in a constant or variable direction between the inlet and the outlet, and wherein the channel rotates about the reference axis at a pitch that is constant or variable, and in a left-handed or right-handed direction with respect to the reference axis.

11. A cross-flow separation element according to claim 10, wherein the pitch is from 0.1 mm to 250 mm, and wherein a distance between the path of the channel and the reference axis is from 0.1 mm to 100 mm.

12. The cross-flow separation element according to claim 1, wherein a portion of the channel is helical.

13. The cross-flow separation element according to claim 1, wherein a portion of the channel is parallel to the reference axis.

14. The cross-flow separation element according to claim 1, wherein the channel extends perpendicularly to the reference axis, or parallel to the reference axis.

15. The cross-flow separation element according to claim 1, wherein the porous support is made from:
- an organic material selected from the group consisting of polyamide, polyetherketoneketone, polystyrene, alumide, polyphenylsulfone, fluorinated thermoplastic elastomer, polypropylene, polyethylene, epoxy, acrylate, acrylonitrile butadiene styrene, polymethyl methacrylate, polycarbonate, nylon, polyetherimide, acrylonitrile styrene acrylate, polylactic acid, polyvinyl chloride, and mixtures thereof; or
- an inorganic material selected from the group consisting of aluminum oxide, titanium oxide, zirconium oxide, aluminum titanate, aluminum nitride, titanium nitride, boron nitride, silicon nitride, sialon, graphite carbon, silicon carbide, tungsten carbide, and mixtures thereof; or
- a metallic material selected from the group consisting of aluminum, alloys of aluminum, alloys of cobalt and chromium, alloys of nickel, alloys of nickel and chromium, steels and stainless steels, titanium, alloys of titanium, alloys of copper and tin, alloys of copper, tin, and aluminum, alloys of copper and zinc, and mixtures thereof.

16. The cross-flow separation element according to claim 1, further comprising a separator layer deposited on an inside wall of the channel;
wherein the separator layer is made from a ceramic material selected from the group consisting of oxides, nitrides, carbides, and other ceramic materials and mixtures thereof, titanium oxide, alumina, zirconia, or a mixture thereof, titanium nitride, aluminum nitride, boron nitride, and silicon carbide, optionally mixed with another ceramic material.

17. The cross-flow separation element according to claim 1, wherein the channel has a hydraulic diameter of from 0.5 mm to 20 mm.

18. The cross-flow separation element according to claim 1, wherein the channel has a hydraulic diameter selected from a constant diameter and a variable diameter.

19. The cross-flow separation element according to claim 1, wherein the support has a mean pore diameter of from 4 µm to 100 µm.

20. The cross-flow separation element according to claim 19, wherein the mean pore diameter corresponds to a d50 value of a volume distribution at which 50% of a total volume of pores correspond to the volume of pores of diameter less than the d50 value, the volume distribution being obtained by mercury penetration, using a technique described in ISO standard 15901-1: 2005.

21. A method of forming a cross-flow separation element, comprising:
forming superposed individual plies that are successively bonded to one another so as to grow progressively the three-dimensional shape of a support, in such a way that the formed cross-flow separation element comprises a single-piece rigid porous support, at least one channel contained within the support, the channel being fully laterally enclosed by channel walls and having an inlet opening formed in a first end of the support, and an outlet opening formed in a second end of the support;
wherein the channel extends in a flexuous path around a reference axis contained within the volume of the support, the channel walls having a shape defined by sweeping a generator plane section along a curvilinear path around said reference axis; and wherein the channel does not intersect the reference axis of the support.

22. The method according to claim 21, comprising making the support by the additive technique in which, by using computer assisted design software, the shape of the support is subdivided into slices, the slices being made one by one in the form of individual plies that are superposed and bonded together in succession by repeating the following two steps: depositing a bed of powder material for forming the support, the bed being continuous, uniform, and of constant thickness, and, at the level of said ply, covering an area that is greater than the section of said porous body to be formed; and consolidating a portion of the deposited material in localized manner in accordance with a pattern determined for each ply so as to create the individual ply;
these two steps being repeated in such a manner as to ensure, at each repetition, that the individual ply formed in this way is simultaneously bonded with the previously formed ply so as to cause the shape of the support to grow progressively.

* * * * *